United States Patent
Grzeszczuk et al.

(10) Patent No.: US 7,062,419 B2
(45) Date of Patent: Jun. 13, 2006

(54) SURFACE LIGHT FIELD DECOMPOSITION USING NON-NEGATIVE FACTORIZATION

(75) Inventors: Radek Grzeszczuk, Mountain View, CA (US); Jean-Yves Bouget, Mountain View, CA (US); Michael H. Chu, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 10/028,414

(22) Filed: Dec. 21, 2001

(65) Prior Publication Data

US 2004/0249615 A1 Dec. 9, 2004

(51) Int. Cl.
*G06F 17/10* (2006.01)
(52) U.S. Cl. .......................................... 703/2; 382/154
(58) Field of Classification Search ................ 703/2; 345/582; 382/154, 253; 707/6
See application file for complete search history.

(56) References Cited

U.S. PATENT DOCUMENTS

| | | | | |
|---|---|---|---|---|
| 6,028,955 A | * | 2/2000 | Cohen et al. | 382/154 |
| 6,128,417 A | * | 10/2000 | Ausbeck, Jr. | 382/288 |
| 6,151,414 A | * | 11/2000 | Lee et al. | 382/253 |
| 6,222,937 B1 | * | 4/2001 | Cohen et al. | 382/154 |
| 6,677,957 B1 | * | 1/2004 | Grzeszczuk et al. | 345/582 |
| 6,687,696 B1 | * | 2/2004 | Hofmann et al. | 707/6 |
| 6,771,723 B1 | * | 8/2004 | Davis et al. | 375/350 |

* cited by examiner

*Primary Examiner*—Leo Picard
*Assistant Examiner*—Carlos Ortiz-Rodriguez
(74) *Attorney, Agent, or Firm*—Sharmini N. Green

(57) ABSTRACT

A system and method are provided for compressing a graphical representation that describes the appearance of an object from a plurality of viewing directions. Compressing includes accessing the graphical representation, removing redundant descriptive information from the graphical representation using sign consistent matrix factorization and approximation techniques, and representing the remaining information for efficient rendering, such as rendering with hardware-assisted computation.

12 Claims, 9 Drawing Sheets

SURFACE LIGHT FIELD DECOMPOSITION USING NON-NEGATIVE FACTORIZATION

BACKGROUND OF THE INVENTION

1. Field of the Invention

The invention relates generally to compressing graphical data for three-dimensional objects. More particularly, the invention relates to a system and method for efficiently compressing graphical data that describes the appearance of a three-dimensional object from multiple viewing directions.

2. Background Information

Accurate portrayal of the physical world has been an important goal of computer graphics since its inception. This includes modeling the geometry and surface attributes of the object when the object is illuminated by a light source and viewed in a virtual environment from a certain vantage point. Typically, the geometry is modeled as a polygonal mesh that models the geometric extents of the object. The surface attributes, which can be modeled in a number of ways, are then applied to the geometry during rendering to graphically display the object.

The essential part of the quest for realistic graphics is proper modeling of the visual attributes of the surfaces of objects. For example, proper modeling of surfaces that have luster, reflections, such as chrome reflections, semi-transparent regions, complex textures like fur, and other qualities, is needed to create realistic visual models of many real-world objects. Theoretical and empirical approaches are possible.

Historically, parametric reflectance models, such as Phong shading, have been favored since they are simple and compact. However these techniques can be inaccurate, are difficult to implement on traditional graphics hardware, and are challenging to develop. An alternative is to use image-based techniques. Such image-based techniques offer a simple method of acquiring the visual data and an accurate method for portraying the physical world. They represent discrete visual data, acquired from the physical world using a variety of imaging devices, directly in the sample-based format without resorting to the parametric models.

However the amount of data associated with such models is enormous. This significantly limits their use, since storage, data transmission, and rendering suffer as a result of the large size of these models. Many images are needed to display the object from different vantage points without creating artifacts. Some approaches interpolate between two related images to reduce the amount of data required, however this approach does not significantly reduce the amount of data needed, and many images are still required to display visually-realistic objects.

BRIEF DESCRIPTION OF THE SEVERAL VIEWS OF THE DRAWINGS

The novel features believed characteristic of the invention are set forth in the appended claims. The present invention is illustrated by way of example, and not by way of limitation, in the figures of the accompanying drawings and in which like reference numerals refer to similar elements. The invention itself, however, as well as a preferred mode of use, will best be understood by reference to the following detailed description of an illustrative embodiment when read in conjunction with the accompanying drawings:

DETAILED DESCRIPTION OF THE INVENTION

In the following description, for the purpose of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

Displaying an Approximate Representation of an Object

Figure 1:
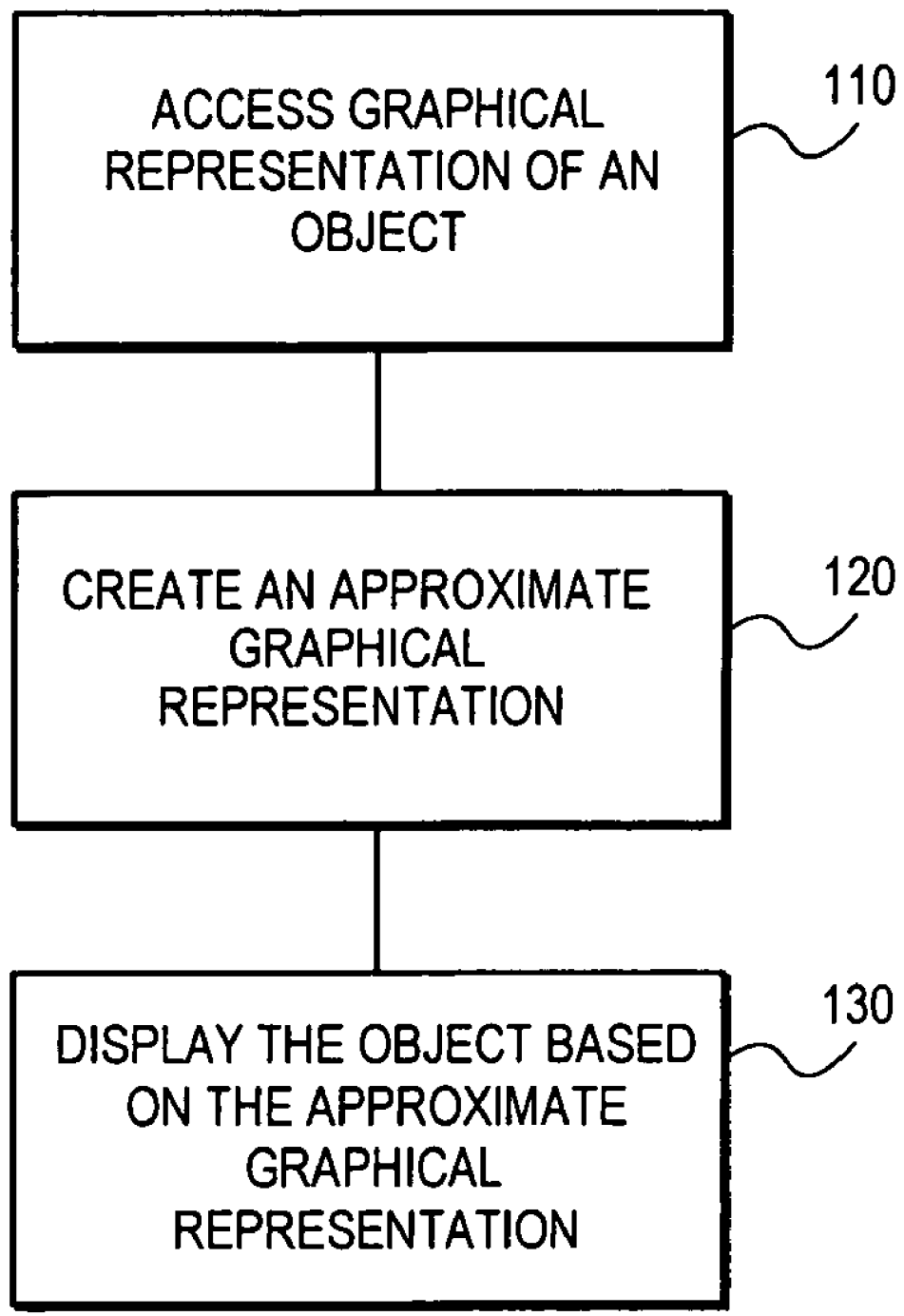
FIG. 1 shows a method for displaying an approximate graphical representation of an object, according to one embodiment of the present invention.

FIG. 1 shows a method for displaying an object using an approximate graphical representation of the object, according to one embodiment of the present invention. Block 110 shows accessing a graphical representation of the appearance of an object, such as a real object or a computer-generated object. Accessing may include loading the representation from a memory location or computer readable medium. Typically, the representation will include a geometry representation, which describes the geometry of the object, and a reflectance representation, which describes the reflective properties of the object.

The geometry representation will typically be polygonal representation, since many graphics pipelines are adept at rendering such representations. For example, the geometry representation may be a triangular mesh that defines the geometric extents of the object. The geometry representation may be created using computer graphics software, such as a wire-frame model created for a fictional animated character, or may be empirically determined for a real object by using cameras, scanners, range sensing equipment, and mesh editing software. Other geometric representations are possible.

The reflectance representation, which may also be called a surface light field, describes the visual appearance of the object, such as the radiance of the object or the light rays reflected by the object. The reflectance representation may describe the appearance when the object is viewed from multiple viewing directions. Frequently, the appearance representation will be a multidimensional appearance representation that includes one or more parameters sufficient to describe a location on the surface of the object, and one or more parameters sufficient to describe a viewing direction that the object is viewed from. For example, the appearance representation may be a four-dimensional representation, either a function or a data set, with two parameters to describe a position on the surface of the object and two parameters to describe a viewing direction. The appearance may vary from point to point and viewing direction to viewing direction, since this is typically the case for real objects.

Additional parameters may be included, such as to specify a location on the interior of the object, to specify motion of the object in space, and for other reasons that will be apparent to those skilled in the art. Since many real-world objects are viewed under constant lighting, such as an object illuminated by the sun or by fixed lighting in a room, the present disclosure will emphasize fixed lighting. However, the invention is equally applicable to variable lighting conditions, such as when lighting varies with time, location on the object, or viewing direction. Each of these additional factors adds a dimension to the graphical representation, so that representations with six or more dimensions may be common. Typically, multidimensional representations of six or higher dimensions become complicated to store and manipulate, requiring significant computing memory and communications capability.

The reflectance representation may be based on analytical approaches, such as parametric reflectance models, or empirical approaches, such as image-based models. In the case of the analytical approaches, the graphical representation will typically be a function, or a discrete data structure generated based on the function. For example, the reflectance representation may be a parametric reflectance model. In the case of the empirical approaches, the graphical representation will typically be a set of images taken of the object from different viewing directions, or a data structure based on the set of images. The reflectance representation will typically be separated from the geometry representation, although they may be combined in other implementations.

The invention will primarily be described in the context of a geometry representation that is a triangular mesh and a reflectance representation that is determined empirically by acquiring data for a real object from different viewing directions under constant lighting conditions. Those skilled in the art will recognize that the invention is equally applicable to other geometry and reflectance representations. According to one embodiment, data acquisition is performed on a real object by taking pictures of the object from different viewing directions with a hand-held digital camera. The object is positioned on a platform with indicia or markings to assist in identifying the camera location. The camera location for each picture is determined based on the indicia. Between 150–300 images are collected of the object, although this number depends on the complexity of the object, such as the symmetry of the object and the level of detail, and the accuracy and quality of the representation. Software is then used to register the triangular mesh to each of the digital images. This registration can be performed with very low error, such as one or a few pixels. Preprocessing may also be performed on these images, such as to filter noise, put the data in a set that facilitates subsequent analysis, and to standardize the data.

Block 120 shows creating an approximate graphical representation based on the original graphical representation. Typically, the reflectance representation will be approximated, since it has more information than the geometry representation, although the geometry representation may also be approximated. The approximate representation may be created by compressing the original representation so that the representation may be stored in less total memory and transferred faster or with less bandwidth. Compressing may be done by removing redundancy from the set of digital images corresponding to different viewing directions. For example, important information from the set of digital images may be selectively represented in the approximate reflectance representation and redundant information may be selectively removed. The important information may be tied to heterogeneity in the object, since symmetry, similar surface attributes, and other features may add redundancy that can be selectively removed. If the information between different views is similar one can chose to retain the information only once. Specular and diffuse information may be separated so that only the changing information may be selectively represented. The compression may be done without spectral analysis of the appearance representation, such as that which is done in DCT approaches, and may be done without creating a codebook, such as in vector quantization.

In one embodiment, creating an approximate graphical representation may include creating a representation with at least one expression having fewer dimensions than an original multi-dimensional graphical representation by decomposing the original multi-dimensional representation. In one embodiment, all of the expressions in the approximate graphical representation have fewer dimensions than the original multi-dimensional graphical representation, although when they are combined, the combination may have the same number of dimensions as the original graphical representation. Decomposing may either select a subset of the most relevant information from the original representation or re-represent the relevant information.

Decomposing is to be interpreted broadly. Decomposing may include consolidating an n-dimensional cloud of disparate values, whether they are truly disparate or disparate due to noise or error, into a lower-dimensional approximation. For example, decomposing may include regression and other forms of statistical consolidation. Decomposing this may include linearly regressing a two-dimensional cloud of disparate values as a linear expression of a predictor. That is, a two-dimensional set of data may be approximated with a one-dimensional expression, such as a regression line.

Decomposing may also include projecting a multi-dimensional representation into a lower-dimensional subspace. According to one embodiment, singular value decomposition is used to decompose a matrix by mathematically approximating each column of the matrix by its orthogonal projection onto the linear subspace spanned by K vectors, where K is an integer greater than or equal to one and that may be increased to improve the approximation of the original representation. The number of vectors K may be varied to provide varying levels of approximation. The original reflectance representation is first expressed as a matrix, such as by rearranging discrete data, then the matrix is decomposed, using singular value decomposition, into a truncatable sum of products of vectors. These vectors may be expressed as two-dimensional matrices, such as by rearrangement, to facilitate rendering. This will be explained more fully below.

Creating may include creating an approximate reflectance representation that is efficiently or quickly manipulated using multiprocessing or hardware operations. For example, the approximate graphical representation may be in a format supported by matrix operations, multitexturing operations, and other operations that allow more data and more complicated operations to be handled simultaneously or in fewer computer operations. For example, the approximate representation may include a first matrix portion to be multiplied by a second matrix portion, which can be quickly and efficiently performed using multitexturing hardware that allows multiple textures to be concurrently applied to a primitive in a single rendering pass. Rather than using hardware, the same format can be concurrently combined or multiplied using multiprocessing, in which multiple processors or multiple computers on a network may simultaneously process or combine the portions. According to one embodiment, the operations to remove redundancy produce data structures that may be combined directly, without decompression, to create an appearance for the object. This differs from other approaches such as run-length approaches, JPEG, and others where the data structures cannot be combined directly until each are first decompressed.

Creating may include creating a viewing-dependent portion, which stores information for different viewing directions, and a position-dependent portion, which stores information for positions on the object (e.g., a triangle). The view-dependent portion may include view-dependent subportions that each correspond to a particular viewing direction, such that one of the view-dependent subportions is concurrently combined with the position-dependent portion to visualize the object from the particular viewing direction. The portions may be substantially different from images of the object take from different viewing directions and may be combined without interpolation to display the object with one appearance for one viewing direction and a different appearance for another viewing direction. For example, the portions may be matrices, which correspond to substantial manipulation and processing of images of the object from different viewing directions, that may be multiplied without interpolation using multitexturing hardware.

Block 130 shows rendering the object using the approximated reflectance representation. Rendering may include accessing the approximate reflectance representation, such as from a memory location, and concurrently processing multiple portions of the approximate reflectance representation to create an appearance for the object or a portion of the object. The portions may have the characteristics discussed above, such as the fact that they may be combined with or without compression, some may be position-dependent and others viewing-dependent, the viewing-dependent portion may have subportions corresponding to particular viewing directions, and other features. The object may then be rendered and displayed by applying the appearances to the object and displaying the object on a display device.

Exemplary Method for Approximating the Object Representation

Figure 2:
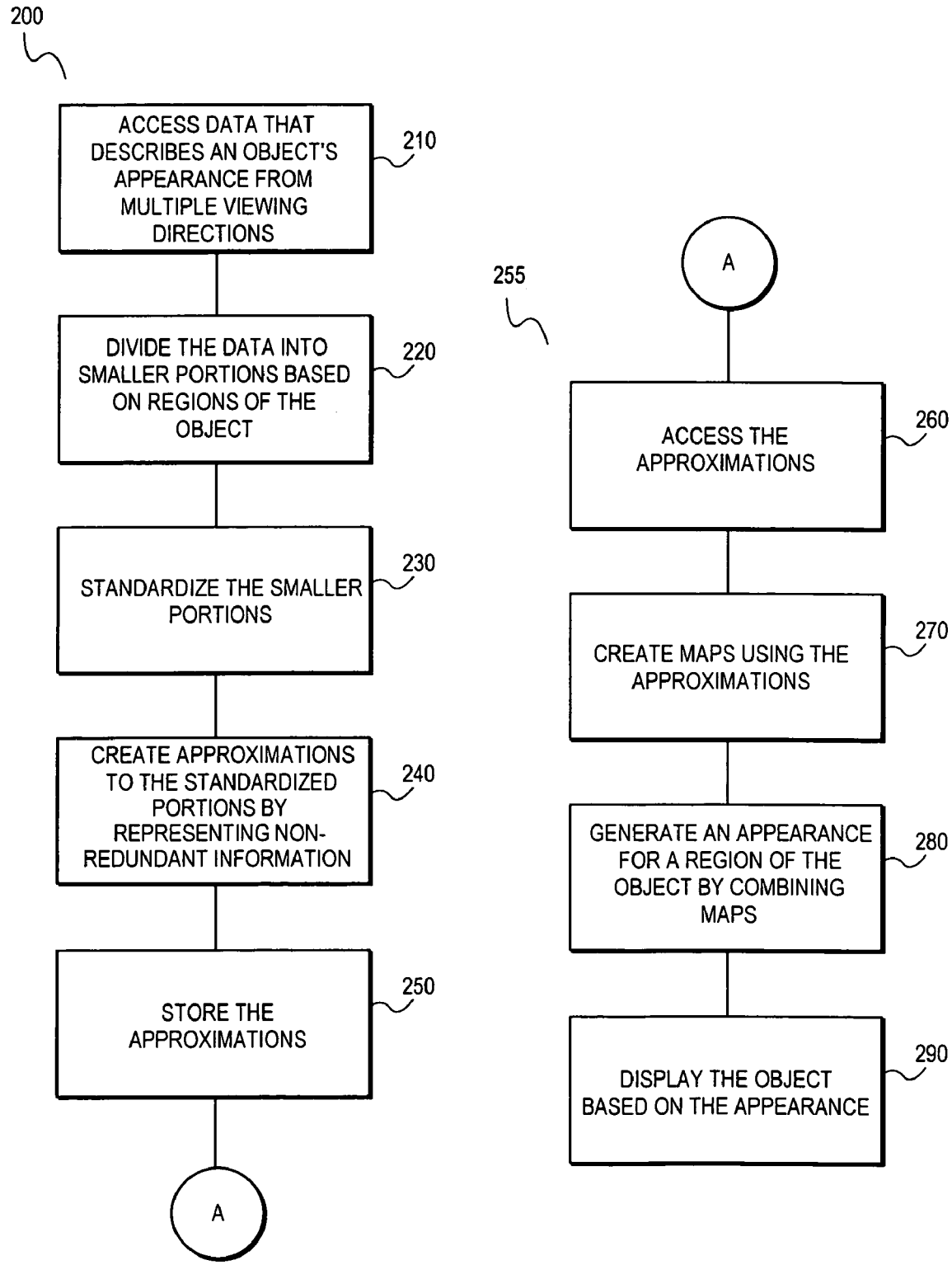
FIG. 2 shows a method for creating approximate graphical representations and using the approximate graphical representations to display objects, according to one embodiment of the present invention.

FIG. 2 shows an exemplary method for creating approximate graphical representations and using the approximate graphical representations to display objects, according to one embodiment of the present invention. According to one embodiment a group of blocks 200 may be performed ahead of time and a second group of blocks 255 may be performed at a different time or in real time. The blocks 200 may also be performed on a first computer system and the blocks 255 performed on a second computer system, such as if the approximations are created on the first computer system and distributed on computer-readable medium or transmitted via a transmission medium to the second computer system.

At block 210 image-based data that describes the appearance of an object from multiple viewing directions is accessed, such as from a memory. For example, the image-based data may be digital images of the object acquired from different known viewing directions as well as acquired geometry data that describes the geometric extents of the surface of the object. Frequently, the image-based data will provide a convenient and accurate way of representing the object, although non image-based data may also be used.

At block 220 the image-based data is divided or partitioned into smaller portions. Typically the smaller portions correspond to primitive-based regions, such as regions defined by triangles in the triangular mesh. For example, image data of the whole object may be divided into subsets of image data corresponding to multiple triangles in the triangle mesh that each describe the appearance within a triangle. In other embodiments partitioning may not be used, although partitioning frequently simplifies subsequent calculations, and allows higher compression if the smaller portions have a higher degree of spatial coherency than original set of image-based data, which is frequently the case.

At block 230 the plurality of smaller portions are standardized. Standardizing may include normalizing the size of each of a plurality of subsets of image-based data to a predetermined size, normalizing a shape of each of the plurality of subsets of image-based data to a predetermined shape. Standardizing may also include using the image-based data or the subsets of image-based data to compute resampled subsets of image-based data that correspond to predetermined standardized viewing directions. For example, the size and shape standardized subsets may be replaced by new subsets that correspond to predetermined standardized viewing directions.

At block 240 approximate graphical representations that approximate the standardized portions are created by selectively representing non-redundant information from the standardized portions. This may include removing redundant viewing direction information and redundant surface location information. Creating may include creating a first data structure that is independent of the viewing direction and a second data structure that includes a plurality of portions that each correspond to a different viewing direction for multiple primitive-based regions of the object.

At block 250 the approximate graphical representations may be stored. Frequently, the approximate graphical representations will be prepared ahead of time to facilitate and accelerate rendering and distribution of the representations.

The approximate graphical representations may be data structures that include a first portion and a second portion. The second portion may have view-dependent subportions that each correspond to viewing directions. The first portion may be combined with each of the view-dependent subportions to generate appearances for the particular viewing direction. These portions may be combined using hardware-assisted computation, such as multitexturing hardware.

At block 260 a plurality of approximate graphical representations are accessed, such as from a memory or from another computer connected via a transmission medium like the Internet. Accessing may include accessing a first data structure that is independent of the viewing direction and a second data structure that includes a plurality of portions that each correspond to a different viewing direction. These data structures may correspond to regions of the surface of the object, such as primitive-defined regions.

At block 270 a plurality of maps are created based on the approximate graphical representations. According to one embodiment, the maps may be considered matrices or may be expressed as matrices so that matrix operations may be performed on the maps. Some of the maps may be based on the first data structure that is independent of the viewing direction while other maps may be based on the second data structure. The maps based on the second data structure may have been configured for a particular viewing direction by selecting the particular subset of data from the data structure corresponding to the viewing direction. Creating the plurality of maps may include distorting the first data structure and the second data structure, such as warping, modulating, translating, or otherwise distorting the data structures.

At block 280 the maps are combined to generate an appearance for the object. The maps may be combined, according to certain predetermined combinations of the maps, to generate an appearance for the object or for a primitive-defined region of the object. Combining may include individually computing or rendering partial appearances of the object that may be combined with other partial appearances to create complete appearances. These complete appearances may be used to display the object on a display device.

At block 290 the object or a region of the object is displayed on a display device based on the appearance and the maps. The image displayed may be refined or improved by better approximating the appearance and combining more maps.

Illustration of the Method Using Singular Value Decomposition (SVD)

Without sacrificing generality, and to illustrate the invention, a system and method are described in greater detail for using a principal component analysis (PCA) based approximation technique known as singular value decomposition (SVD) to decompose a reflectance representation known as a surface light field into an approximate graphical representation and display the object from multiple viewing directions using the approximate representation. The surface light field is a four-dimensional reflectance representation, written as $f(r, s, \theta, \phi)$, that completely defines the radiance of every point on the surface of an object in every viewing direction. The two parameters r and s describe the surface location and the two parameters $\theta$ and $\phi$ describe a viewing direction. SVD was selected to illustrate the broader concepts of the invention because SVD is robust, produces near optimal approximations for a given amount of compression, allows approximations of various accuracies, allows progressive refinement of an image, and facilitates fast rendering using graphics hardware. Other methods are possible.

Singular value decomposition decomposes and represents a matrix with a mathematical identify, the identity may be truncated to create an approximation. According to SVD, the surface light field representation $f(r, s, \theta, \phi)$ may be decomposed into a sum of products of lower-dimensional surface maps $g_k$ and view maps $h_k$, as shown by the following equation:

$$f(r, s, \theta, \phi) \approx \sum_{k=1}^{k} g_k(r, s) h_k(\theta, \phi) \quad (1)$$

This equation approximates the surface light field function as a sum of K products of a first function $g_k(r,s)$ and a second function $h_k(\theta, \phi)$.

In the equation above, the product terms decrease in importance with increasing index k. That is, the first product term is the most important, followed by the second, etc. Frequently the above sum of product terms will be truncated to generate an approximation to the surface light field representation. This representation allows any desired number of product terms to be included to provide any level of approximation of the surface light field. For example, only K product terms may be used, where K is less than the number required for an exact approximation. Efficient algorithms for computing the first few summation terms, which correspond to the largest eigenvalues, are well known to those skilled in the art. For example, it may be computed using MATLAB 6.0, available from The MathWorks of Natick, Mass.. Fewer terms are generally needed when objects exhibit a high spatial coherency over the decomposed region. In many cases only two terms are needed.

This approach offers a number of advantages. First, the approach allows significant compression without significantly sacrificing image quality. Second, additional terms may be added to improve the approximation. This yields very well to progressive encoding, where instead of rendering a high quality image slowly a lower quality image is displayed and then refined. This makes the method amenable to streaming of data over computer networks, such as the Internet. Additionally, this allows computer programs and applications to refine objects by increasing K or adding additional terms when it is desirable to do so, or when computer resources are available to do so. Third, since the surface and view maps may be represented as matrix or texture maps, they may be quickly and efficiently manipulated, such as through matrix operations. Additionally, graphics hardware that supports multitexturing may form a product of each pair of the surface and view maps in comparatively few operations.

Illustration of Methods Using Sign Consistent Factorizations

For certain applications, alternative matrix factorization methods for decomposition of surface light field data are preferred. Surface light field data according to equation (1) can be decomposed into a sum of products of two 2-dimensional functions where each product is sign consistent to be either strictly positive, or to have a strictly defined positive and negative pattern. Such a decomposition permits use of a simple data representations and fast rendering routines that can be made fully hardware-accelerated using basic multi-texturing support. Without sacrificing generality, and to illustrate the invention, two different systems and methods are described in greater detail for sign consistent factorizations to decompose a surface light field:

1) Non-Negative Matrix Factorization

Non-negative matrix factorization (NMF) uses non-negativity constraints that lead to parts-based representation because they allow only additive, not subtractive, combinations. NMF produces bases that represent approximated localized features of the data.

To better understand NMF, consider a matrix F of size m×n containing only non-negative values. NMF produces a factorization of the form $$F = \sum_{i=1}^{k} g_i h_i$$

where vectors $g_i$ and $h_i$ are constrained to be non-negative. Because all factors are non-negative, the matrix F is represented as a sum of parts, i.e., no subtraction is ever required.

NMF uses the following rules to compute the positive only factors $$g_i = g_i \sum_c \frac{F_c}{(g_i h_i)_c} h_{ic}$$

$$g_i = \frac{g_i}{\sum_r g_{ir}} \text{ and}$$

$$h_i = h_i \sum_c g_{ic} \frac{F_c}{(g_i h_i)_c}$$

where c refers to the column index of matrix F or vector $h_i$ and r refers to the row index of matrix F or vector $g_i$. By construction, this set of rules produces non-negative factors $g_i$ and $h_i$ and can be shown to converge monotonically.

This type of factorization can be used for simple and fast rendering in the following way $$F = g_1 h_1 + g_2 h_2 \Lambda g_k h_k$$

2) Alternating Sign Matrix Factorization

The alternating sign matrix factorization (ASMF) is computed in the following way. First, compute one term approximation $T_1$ of vertex light field matrix F, either using PCA or NMF $$T_1 = g_1 h_1$$

By construction the one term approximation is positive only. Next, compute the difference between the matrix F and $T_1$ and represent the result as a sum of two matrices, one strictly positive and one strictly negative $$D_1 = F - T_1 = D_1^+ + D_1^-$$

Compute 1-term approximation of the strictly negative matrix $$D_1^- = g_1^- h_1^-$$

Compute the following difference and represent the result as a sum of two matrices, one strictly positive and one strictly negative $$D_2 = F - T_1 - D_1^+ = D_2^+ + D_2^-$$

Compute 1-term approximation of the strictly positive matrix $$D_2^+ = g_2^+ h_2^+$$

Continue in that fashion until enough approximation terms were computed.

This type of factorization can be used for simple and fast rendering in the following way.

$$F = T_1 - (-D_1^-) + D_2^+ - (-D_3^-) + D_4^+ - \Lambda$$

Advantageously, as compared to comparable PCA based techniques, a rendering sequence using NMF or ASMF based processing (using commonly available graphic hardware that support at least two texture sources) only requires at most 3K rendering passes to evaluate a K-term light field approximation. If multitexturing support is not available in hardware, software methods using an accumulation buffer can be employed, although it will be significantly slower.

Data Acquisition and Resampling

Frequently, the surface light field is available in a discrete form as a set of points in a four-dimensional space, rather than in a continuous form. For example, the surface light field may correspond to a sparse set of images registered to a polygonal approximation (e.g., a triangular mesh) of the surface of the object. In such situations, preprocessing and resampling may be used to standardize the data and facilitate the system and method. Particular preprocessing is discussed below, although other approaches are possible. In other implementations, some or all of preprocessing may not be used, although for the case of SVD, NMF, or ASMF it frequently simplifies the method and gives better results.

Data Acquisition

The surface light field may be generated with image-based data, such as acquired geometry and reflectance data. The input data consist of a triangular mesh acquired by a range scanner and pictures taken from known locations under constant lighting conditions. A total of $N_I$ (typically $150 < N_I < 300$) images are captured with a hand-held digital camera. An exemplary image may have a 2000×1312 pixel size. However, the image size is not important to the present invention. In one embodiment, the object is placed on a specific platform designed for the purpose of automatic registration. The platform contains indicia, such as colored circles, that allow and guide the automatic detection of the grid corners that are used for computing the 3D location of the camera. The color circles are automatically detected on the images using a single color segmentation scheme. This provides an initial guess for the position of the grid corners that are then accurately localized using a corner finder. The precise corner locations are then used to compute the 3D position of the camera relative to the object. This may be done, given that the camera has been pre-calibrated. The outcome of this process is a set of the $N_I$ images captured from known vantage points in 3D space. The object geometry is computed in a second stage of data acquisition. A structured lighting system consisting of a projector and a camera is used for that purpose. The projector is used to project a translating striped pattern onto the object. Temporal analysis is used for accurate range sensing. In order to facilitate scanning, the object is painted with white removable paint, which is especially useful when dealing with dark, specular, and semi-transparent objects. Typically, 10–20 scans are needed, although this number depends on the desired accuracy and complexities of the object. Between consecutive scans, the object is rotated in front of the camera and projector, such as by 20 degrees. For that purpose, the calibration platform has been designed to rotate about a central axis. The individual scans are automatically registered together in the object reference frame using the same grid corners previously used for image registration. The complete 3D triangular mesh may consist of approximately 7228 triangles. The resulting cloud of points, which may be approximately 500,000 points, is fed to mesh-editing software to build the final rectangular surface mesh. Since the same calibration platform is used for image and geometry acquisition, the resulting triangular mesh is naturally registered with respect to the $N_I$ camera images. The geometry and the images may be precisely aligned, with image reprojection errors of less than one pixel. This image-based data may be stored in a memory.

The image-based data may be accessed, such as from memory and preprocessed to facilitate subsequent processing. Preprocessing may include visibility computation, which consists of identifying, for each mesh triangle, the set of camera images it is visible from. The process begins by rendering the object from the vantage point of the first camera image and reading out the resulting z-buffer, an area in graphics memory reserved for storing the Z-axis value of each pixel. The process continues by transforming the triangle vertices into the reference frame of the first camera image. The depth of the triangle vertices in the reference frame of the first camera image can then be compared against the corresponding values in the z-buffer to determine the visibility of the triangle in the first camera image. If at least one of the vertices of the triangle is not visible, the whole triangle is marked as occluded. This process is repeated for all $N_I$ images to give a list of views each triangle is visible from. Thus, the image-based data is divided or partitioned into smaller portions based on triangle-defined regions of the object. This information is used to resample the raw light field data.

Resampling

Standardization of the smaller portions of the object may be performed. For example, the size and shape of the triangles may be standardized and a standardized set of viewing directions may be used to represent the triangles. During data acquisition the camera views that each triangle is visible in and the viewing angles of these views in the triangle reference frame were computed. Note that the visible triangle views correspond to a set of texture patches of irregular size captured from irregular viewing directions. The texture patches may be resampled into a more convenient and easier to process format before decomposition. First, resampling is performed on the sizes of the texture patches. Then resampling is performed on the viewing directions.

Normalization of the sizes of the texture patches may be performed. As will be explained below, each view of the triangle $\Delta_i$ consists of exactly the same number of samples $M_{\Delta_i}$. This corresponds to the fact that each column of matrix $F^{\Delta_i}$ has the same size. The same is true for matrix $F^{vj}$. To this end, each texture patch is normalized to a consistent size and shape by warping it using texture mapping graphics hardware. According to one embodiment, the view that projects to the largest image area may be identified, this area may be multiplied by 2, all triangles may be resized to this area, and then the decomposed light field maps may be subsampled by 2 after the decomposition. The number of pixels after resampling, $M_{\Delta_i}$, varies from 1 pixel, for 1 triangle textures, to 2080 pixels, for 64×64 triangle textures.

Resampling of texture viewing directions may also be performed. Note that the resampling of texture images ensures that there are a uniform number of samples for each triangle view, but does not ensure that sampling of views is uniform. However, a regular sampling of the viewing directions makes the method work better. For example, consider a triangle with a lot of similar views and a few distinct views, the singular value decomposition of these views will produce a result that is biased toward the cluster of similar views and that neglects the other views. This can be avoided by resampling the triangle views in the space of viewing directions before performing the decomposition. That is, the viewing direction for the visible triangle views is projected using Equation 13, provided below. Then, the weighting factors for the viewing directions that project on a regular grid of points from the Delaunay triangulation of the original projected views are computed. Finally, a set of triangle views that project on the regular grid by blending the initial triangle views using the corresponding weighting factors are computed. This assumes the viewing direction is constant across each triangle, which is a good approximation for small triangles, such as those in the mesh. Alternatively, more accurate interpolations are possible.

The resolution of the viewing angles can vary from triangle to triangle, however a fixed number of samples is frequently selected. The current discussion pertains primarily to a resolution of 32×32=1024. Generally there is no visible image degradation when 16×16=256 resolutions are used. Choosing fixed numbers of viewing directions across separate triangles simplifies the construction of the vertex light fields $F^{vj}$ since the triangle light field matrices $F_{\Delta i}^{vj}$ making up the vertex light field matrix all have the same number of columns.

The resulting graphical representation of the object may be stored in memory. Typically, these representations are large in size. These representations may be accessed and approximate graphical representations may be created that contain less redundant information and that are faster to render.

Applying Singular Value Decomposition

The discrete surface light field discussed above is a four-dimensional grid $f(r_p, s_p, \theta_q, \phi_q)$, where $p=1, \ldots, M$ refers to the discrete values $(r_p, s_p)$ describing the location on the surface of the object and index $q=1, \ldots, N$ refers to the discrete values $(\theta_q, \phi_q)$ of the viewing angles. Approximations may be created for each of these surface locations (e.g., triangle portions) by representing non-redundant information. The decomposition according to Equation 1 then becomes:

$$f(r_p, s_p, \theta_q, \phi_q) \approx \sum_{k=1}^{K} g_k(r_p, s_p) h_k(\theta_q, \phi_q) \qquad (2)$$

In other words, the discrete surface light field function is approximated by a sum of K product terms of surface maps, $g_k$, and view maps, $h_k$. The surface maps and view maps are collectively known as light field maps.

The four-dimensional surface light field data is rearranged into a matrix. As an example, consider a surface light field $f^P(r_p, s_p, \theta_q, \phi_q)$ corresponding to a surface element P. The 4-dimensional structure of this partial surface light field is rearranged into a matrix so that each row of the matrix corresponds to a different location on the surface element P and each column of the matrix represents a different viewing direction for a given sample. If surface element P consists of M distinct surface samples and each surface location is visible from N viewing directions, the resulting M×N matrix can be written as:

$$F^P = [f_1^P f_2^P K f_N^P] \qquad (3)$$

Where vector $f_i^P$ of size M×1 represents the appearance of the surface element P under the $i^{th}$ viewing direction.

Before discussing the approach in further detail it may be helpful to discuss terminology. A matrix refers to a square or rectangular field of numerical values divided into horizontal rows and vertical columns. An M×N matrix is a matrix with M rows and N columns. A diagonal matrix is a square matrix having an equal number of rows and columns and in which only the elements situated on the main diagonal of this matrix (i.e., the first element in the first row, the second element in the second row, etc.) has a non-zero value. A transposed matrix is a matrix formed by interchanging the rows and columns of a reference matrix. Frequently a transposed matrix will be denoted by the raised index T(e.g., $X^T$). A vector is a series of discrete numerical values that can be regarded as a one-dimensional matrix. Matrix is meant to include vector, since a vector is a special type of matrix.

The singular value decomposition of $F^P$ is the factorization $F^P = USV^T$ where the two square matrices $U=[u_1, u_2, \ldots, u_M]$ and $V=[v_1, v_2, \ldots, v_N]$ are unitary and $S=diag(\sigma_1, \ldots, \sigma_N)$ is a diagonal matrix of positive and monotonically decreasing singular values $\sigma_k$. The matrix product $USV^T$ can be written as a sum:

$$F^P = \sum_{k=1}^{N} \sigma_k u_k v_k^T \qquad (4)$$

In other words, the matrix $F^P$ can be rewritten as a sum of N different products of $\sigma_i u_i v_k^v$. Truncating the above sum from N to K corresponds to approximating each column of matrix $F^P$ by its orthogonal projection onto the linear subspace spanned by K vectors $u_1, \ldots, u_K$. This operation results in an optimal root mean square approximation of $F^P$ given a fixed budget of K vectors.

To obtain the form of decomposition as in Equation 2, each summation term in Equation 4 is rewritten as $(\sigma_k^u u_k)(\sigma_k^u u_k)$ where $\sigma_k = \sigma_k^u \sigma_k^v$ and rearrange vector $u_k' = \sigma_k^u u_k$ into the surface map $g_k^P(r_p, s_p)$ and vector $v_k'$ into the view map $h_k^P(\theta_q, \phi_q)$. There are well documented and efficient algorithms known to those skilled in the art for computing partial SVD giving vectors corresponding to the first few largest singular values. With appropriate changes, the forgoing method can be computed using NMF or ASMF.

Those skilled in the art will appreciate that matrix decomposition may be applied to the surface light field representation in different ways, without deviating from the spirit and scope of the present invention. The discrete function can be directly manipulated using SVD. However, the resulting approximation would typically require many decomposition terms. Additionally, the decomposition may be expensive to compute due to the large size of the surface light field matrix. Instead, it is frequently more practical to partition the complete surface light field into smaller representations and perform the computations on each part separately. Partitioning the surface light field based on primitives is a logical choice for many implementations. This reduces the computational burden, and additionally the small regions exhibit significant spatial coherency over the region, which means that these small regions can be significantly and accurately compressed using singular value decomposition.

Without loss of generality, two specific approaches are disclosed below. Since the surface will typically be represented with a triangular mesh, it is intuitive to partition the light field matrix into individual mesh triangles. This approach is called triangle-centered approximation and will be discussed first. The second approach is called vertex-centered approximation and may be used when discontinuities in the appearance of the object are not desirable.

Triangle-Centered Approximation

The discrete representation may be partitioned between each triangle in the mesh geometry, as given by the equation:

$$f(r, s, \theta, \phi) = \sum_{i=1}^{n} \Pi^{\Delta_i}(r, s) f(r, s, \theta, \phi) \qquad (5)$$

In other words, the surface light field is rewritten as a sum over the total number of mesh triangles, n, of a product of the triangle domain function $\pi^{\Delta_i}(r,s)$, which is equal to one within the triangle $\Delta_i$ and zero everywhere else, and the surface light field. Each summation term in Equation 5 has then a finite support over a single triangle and corresponds to the part of the surface light field over this triangle.

Figure 3:
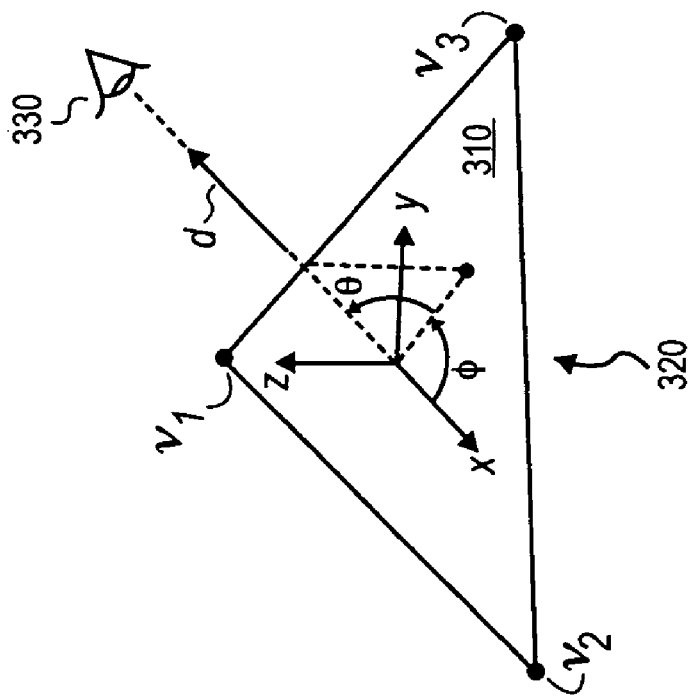
FIG. 3 shows a unitary viewing vector expressed in a triangle-centered reference frame, according to one embodiment of the present invention.

FIG. 3 shows a triangle-centered coordinate system or reference frame for an exemplary triangle 310 belonging to a triangular mesh used to represent the object. The triangle includes a first vertex $v_1$, a second vertex $v_2$, and a third vertex $v_3$. The triangle includes an xyz coordinate system 320 located sufficiently close to the center and where the x- and y-axis are in the plane of the triangle and the z-axis is perpendicular to the plane of the triangle. The x-axis is parallel to the side connecting $v_1$ and $v_2$ and the y-axis is parallel to the side connecting $v_2$ and $V_3$. The triangle is viewed from an eye location 330 with a particular viewing direction with respect to the origin of the coordinate system. A unitary viewing direction vector d points from the coordinate system toward the eye location 330 and is used to capture the viewing direction. The unitary vector is identified in terms of two viewing direction angles $\theta$ and $\phi$, the azimuth and elevation angles of the unitary vector in the fixed reference frame attached to the triangle. The angle $\theta$ is the angle in the xy-plane between the x-axis and a projection of the unitary vector into the xy-plane. Likewise, the angle $\phi$ is the angle between the projection and the unitary vector pointing from the origin of the coordinate system towards the eye location. In the final step of partitioning, the surface light field is reparameterized corresponding to each triangle in the local coordinates, to generate a triangle light field, and denoted as $f^{\Delta_i}(r,s,\phi,\theta)$. Note that the same letters are used to denote the local parameters of the triangle light field to simplify the notation.

Consider the approximation of the discrete surface light field over triangle $\Delta_i$, which is similar to the approximation given by Equation 2, but in the triangle-centered approach:

$$f^{\Delta_i}(r_p, s_p, \theta_q, \phi_q) \approx \sum_{k=1}^{K} g_k^{\Delta_i}(r_p, s_p) h_k^{\Delta_i}(\theta_q, \phi_q) \qquad (6)$$

where $(r_p, s_p)$ are the $M^{\Delta_i}$ discrete surface samples of triangle $\Delta_1$, and $(\theta_q, \phi_q)$ are the N discrete viewing direction angles represented in the triangle reference frame. Just as the discrete surface light field data $f^P(r_p, s_p, \phi_q, \theta_q)$ are rearranged corresponding to the surface element P into matrix $F^P$, the discrete triangle light field data $f^{\Delta_i}(r_p, s_p, \phi_q, \theta_q)$ is rearranged into a matrix:

$$F^{\Delta_i} = [f_1^{\Delta_i} f_2^{\Delta_i} K f_N^{\Delta_i}] \qquad (7)$$

where each column of the matrix represents the appearance of the triangle $\Delta_i$ under a different viewing direction. The resulting matrix of size $M^{\Delta_i} \times N$ is referred to as the triangle light field matrix. The same approximation steps that were performed to process matrix $F^P$ may be used to process this matrix to give the approximation corresponding to Equation 6.

Although the triangle-based decomposition offers an elegant way of representing and compressing the complete surface light field data, when rendered, it produces visible discontinuities at the edges of the triangles for a small number of decomposition terms.

Vertex-Centered Approximation

The visible discontinuities across triangle boundaries may be eliminated by partitioned the surface light field matrix around every vertex. This approach is written analogously to Equation 5:

$$f(r, s, \theta, \phi) = \sum_{j=1}^{m} \Lambda^{v_j}(r, s) f(r, s, \theta, \phi) \qquad (8)$$

where m is the total number of vertices $v_j$ in the mesh geometry, and each umbrella function $\Lambda^{v_j}(r,s)$ takes values between zero and one in the ring of triangles around vertex $v_j$, and zero everywhere else. Each summation term in Equation 8 has then a finite support over the ring of triangles around $v_j$ and corresponds to the part of surface light field over this ring. Equation 8 defines a valid partitioning of the surface light field function only if the sum of all weighting functions $\Lambda^{v_j}(r,s)$ equals 1 over the whole object surface. One possible choice for the functions $\Lambda^{v_j}(r,s)$ is the barycentric weight of each point in the ring of triangles relative to vertex $v_j$. Such results are sufficiently continuous for many applications.

Figure 4:
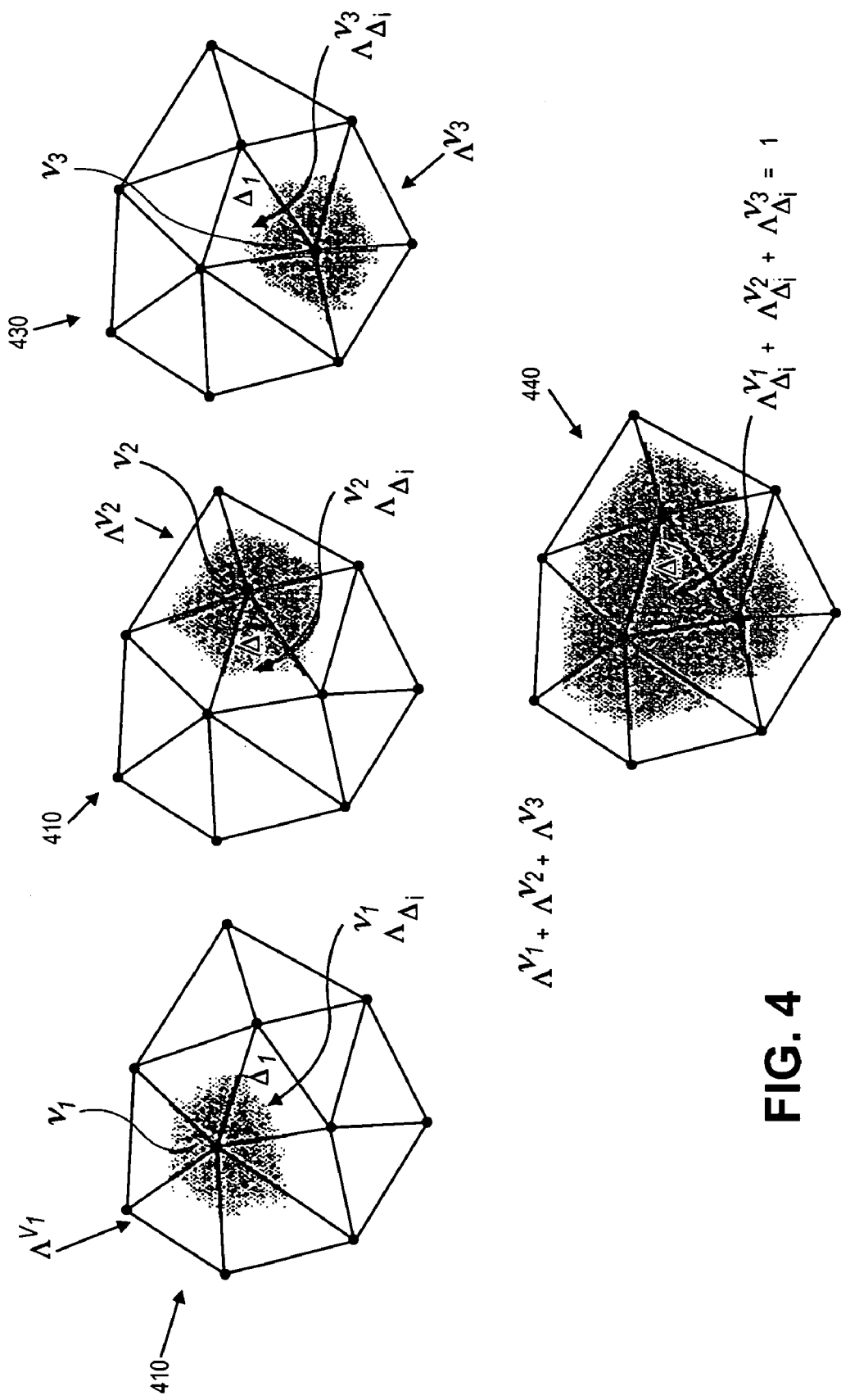
FIG. 4 shows summation of an umbrella function for a given triangle, according to one embodiment of the present invention.

FIG. 4 shows the three umbrella functions $\Lambda^{v_1}$, $\Lambda^{v_2}$, and $\Lambda^{v_3}$ for the three vertices of an exemplary triangle $\Delta_i$. The exemplary triangle has vertices $v_1$, $v_2$, and $v_3$. The exemplary triangle is surrounded by ten triangles that are all alike in that each one shares a vertex with the exemplary triangle. Four separate instances of the ten triangles are shown, including a first instance 410 to illustrate the umbrella function for $v_1$ (labeled $\Lambda^{v_1}$), a second instance 420 to illustrate the umbrella function for $v_2$ (labeled $\Lambda^{v_2}$), a third instance 430 to illustrate the umbrella function for $v_3$ (labeled $\Lambda^{v_3}$), and a fourth instance 440 to show the combination of the three umbrella functions (e.g., $\Lambda^{v_1} \Lambda^{v_2} + \Lambda^{v_3}$) In each case, gradient shading is used to indicate the domain of the umbrella function. That is, the umbrella function corresponding to vertex $v_1$, $\Lambda^{v_1}$, has finite support only over the six triangles making up vertex $v_1$, as indicated by the gradient shading. Umbrella functions $\Lambda^{v_2}$, and $\Lambda^{v_3}$ correspond to vertices $v_2$, and $v_3$ and have similar characteristics. The fourth instance shows that the three umbrella functions for the three vertices add to one inside triangle $\Delta_i$. That is, $(\Lambda^{v_1} + \Lambda^{v_2} + \Lambda^{v_3}) = 1$ inside the exemplary triangle $\Lambda_1$. This condition holds in general for all mesh triangles:

$$\pi^{\Delta_i}(r,s) = \Lambda_{\Delta_i}^{v_2}(r,s) + \Lambda_{\Delta_i}^{v_2}(r,s) + \Lambda_{\Delta_i}^{v_3}(r,s) \qquad (9)$$

In other words, the triangle domain function introduced in Equation 5 to partition the surface light fields based on triangles, is equal to a sum of the three umbrella functions for each of the three vertices of the given triangle evaluated over the triangle.

Figure 5:
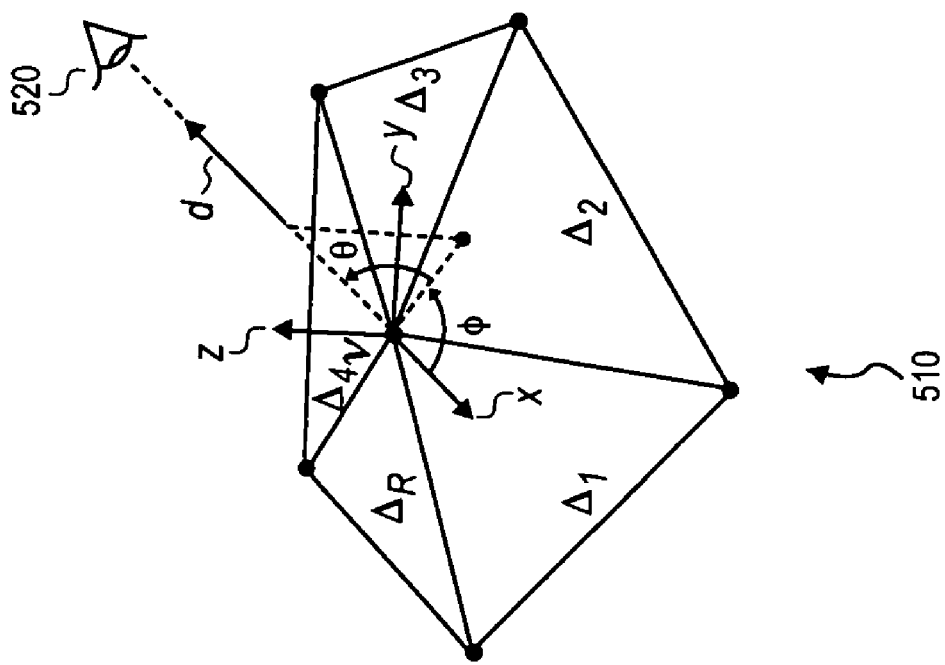
FIG. 5 shows a unitary viewing vector expressed in a vertex-centered reference frame, according to one embodiment of the present invention.

FIG. 5 shows a vertex-centered coordinate system or reference frame for an exemplary vertex v belonging to a triangular mesh used to represent the object. The vertex v is a common vertex for each of triangles $\Delta_1$, $\Delta_2$, $\Delta_3$, $\Delta_4$, and $\Delta_R$ that form a ring of triangles 510. Although only five triangles are shown, the method is applicable to any number of triangles R. The vertex v is the origin of an xyz coordinate system 510 where the z-axis is parallel to the surface normal at the vertex and the x-axis and y-axis are mutually perpendicular and in a plane perpendicular to the z-axis. The vertex is viewed from an eye location 520 having a particular viewing direction with respect to the vertex. A unitary viewing direction vector d points from the origin of the coordinate system toward the eye location 520 and is used to capture the viewing direction. The unitary vector is identified in terms of two viewing direction angles $\theta$ and $\phi$, the azimuth and elevation angles of the unitary vector in the fixed reference frame attached to the triangle. The angles $\theta$ and $\phi$ have a similar interpretation as in the triangle-centered approximation discussed in FIG. 2.

In the final step of vertex-centered partitioning the surface light fields corresponding to each vertex are reparameterized in the local coordinates of the vertex to create the vertex light field, which is denoted by $f^{v_j}(r, s, \theta, \phi)$. Note that the same letters are used to denote the local parameters of the vertex light field in order to simplify the notation.

Consider the approximation of the discrete vertex light field data over vertex $v_j$:

$$f^{v_j}(r_p, s_p, \theta_q, \phi_q) \approx \sum_{k=1}^{K} g_k^{v_j}(r_p, s_p) h_k^{v_j}(\theta_q, \phi_q) \qquad (10)$$

where $(r_p, s_p)$ are the $M^{v_j}$ surface samples covering the whole ring of triangles, and $(\theta_q, \phi_q)$ are the N discrete viewing direction angles represented in the vertex reference frame. Assume, without loss of generality, that triangles $\Delta_i$, $\Delta_1$, ..., $\Delta_R$ form the ring around the vertex. Then, similarly to the case of the triangle-centered decomposition, the vertex light field $f_{v_j}(r_p, s_p, \theta_q, \phi_q)$ may be represented by the matrix:

$$F^{v_j} = \begin{bmatrix} w_{\Delta_i}^{v_j} & F^{\Delta_i} \\ w_{\Delta_2}^{v_j} & F^{\Delta_2} \\ & M \\ w_{\Delta_R}^{v_j} & F^{\Delta_R} \end{bmatrix} \qquad (11)$$

where each matrix $w_{\Delta_i}^{v_j} F^{\Delta_i}$ is the weighted triangle light field matrix corresponding to the ring triangle $\Delta_i$ and the square diagonal matrices $w_{\Delta_i}^{v_j}$ are computed based on the barycentric coordinates of the points in the ring following the definition of $U_{\Delta_i}^{v_j}$. The resulting matrix $F^{v_j}$ of size $M_{\Delta_i}^{v_j} \times N$ is referred to as the vertex light field matrix. The same approximation steps used on matrix $F^P$ may be used on matrix $F^{v_j}$ to give the form of approximation of Equation 10.

Although the terms of the vertex-centered decomposition are computed at each vertex, the resulting approximation can be expressed independently for each triangle $\Delta_i$ as:

$$f^{\Delta_i}(r_p, s_p, \theta_q, \phi_q) = \sum_{j=1}^{3} f_{\Delta_i}^{v_j} \qquad (12)$$

where the index j runs over the three vertices of the given triangle and $f_{\Delta_j}^{v_j}$ describes the part of the vertex light field corresponding to the ring of triangle $\Delta_j$.

Note that in the triangle-centered decomposition each triangle shares its three vertex view maps $h_k^{v_j}(\theta_q, \phi_q)$, j=1, 2, 3, with the neighbor triangles. This insures an approximation that is continuous across triangles regardless of the number of approximation terms K.

Compression Ratio Affected by Surface Primitives

The approximation of surface light fields using light field maps can be thought of as a method of compressing the raw light field data that takes advantage of the data's spatial coherence. The compression ratio achieved through this approximation is closely related to the size of the surface primitives (e.g., mesh triangles) used during the decomposition. Large mesh triangles results in a higher compression ratio since a smaller number of view maps can represent the complete set of data. However, such mesh triangles are less spatially coherent than smaller triangles and need more terms to approximate the original data to the same degree. Additionally, large light field matrices are computationally expensive to decompose. These effects may be balanced to select a convenient point where the compression ratio remains high and the resulting light field approximation produces good results. For example, the size of the mesh triangle may be experimentally varied to balance obtaining a high compression ratio and preserving the visual quality of the results. Frequently this will give several hundred pixels for average surface maps. Typically, the effects can be balanced to achieve two orders of magnitude compression and good visual results.

Compression of the Surface and View Maps

The surface light field approximations exhibit additional redundancy not removed by the singular value decomposition and when desired some of this redundancy may be removed by additional compression. For example, the light field maps corresponding to the different surface primitives often look similar if the material properties and the lighting conditions across these surface primitives are the same. Note that this no longer has to be spatial coherence, since the similar light field maps might correspond to non-contiguous surface elements. To exploit this redundancy and produce even more compact representations, these light field approximations can be further compressed. Since light field maps are represented as 2D images, they may be compressed using a variety of existing image compression algorithms.

The types of algorithms used for compression differ depending on whether run-time performance or storage requirements motivate the compression. For hardware with a limited high bandwidth texture cache, texture swapping is quite expensive and thus rendering performance deteriorates significantly if the light field maps do not reside entirely in the cache. For this reason, the compressed light field map textures may be placed entirely in the texture memory cache. However, this may limit the type of compression algorithms used. For example, we may need to render from the compressed format or perform the decompression in hardware. Minimizing storage requirements does not constrain the compression step as much, and allows different compression algorithms to be used.

By way of example, when run-time memory reduction is important, vector quantization may be used to achieve a 10:1 reduction and hardware texture compression (e.g., S3TC) may be used to achieve a 6:1 reduction. When storage reduction is important, wavelet or DCT-based compression may be used to achieve an 8:1 reduction and entropy encoding may be used to achieve an additional 2:1 reduction.

Compression Results

Surface light fields for five objects with varying complexity and surface attributes were compressed using singular value decomposition as described above. Considering three summation terms of the mean-extracted, vertex-centered approximation, compression ratios for the five objects ranged from 68:1 to 117:1. The light field maps themselves ranged in size from 8.1 MB to 44 MB. Further compression of these light field maps using vector quantization and S3TC hardware compression gave total compression ratios that ranged from 2106:1 to 4167:1. These ratios are calculated with respect to the raw surface light fields, neglecting the geometry and texture coordinate information, which is generally small compared to the light field maps.

Rendering Surface Light Fields

The surface light field approximations may be rendered to display an object on a display device. The approximations may be accessed, processed by a rendering algorithm, and the object displayed. Accessing may be from a memory or from a remote location by a transmission medium.

Rendering Algorithm

Both the triangle-centered and the vertex-centered surface light field approximations result in a separate set of light field maps for each mesh triangle. This is reflected by Equation 6 for the triangle-centered approximation and by Equation 12 for the vertex-centered approximation. Rendering from either approximation proceeds by treating each triangle independently. This means that for both approximations the rendering procedure may be based on only a single triangle to completely describe the algorithm. The algorithm may be used to render each triangle one at a time.

Figure 6:
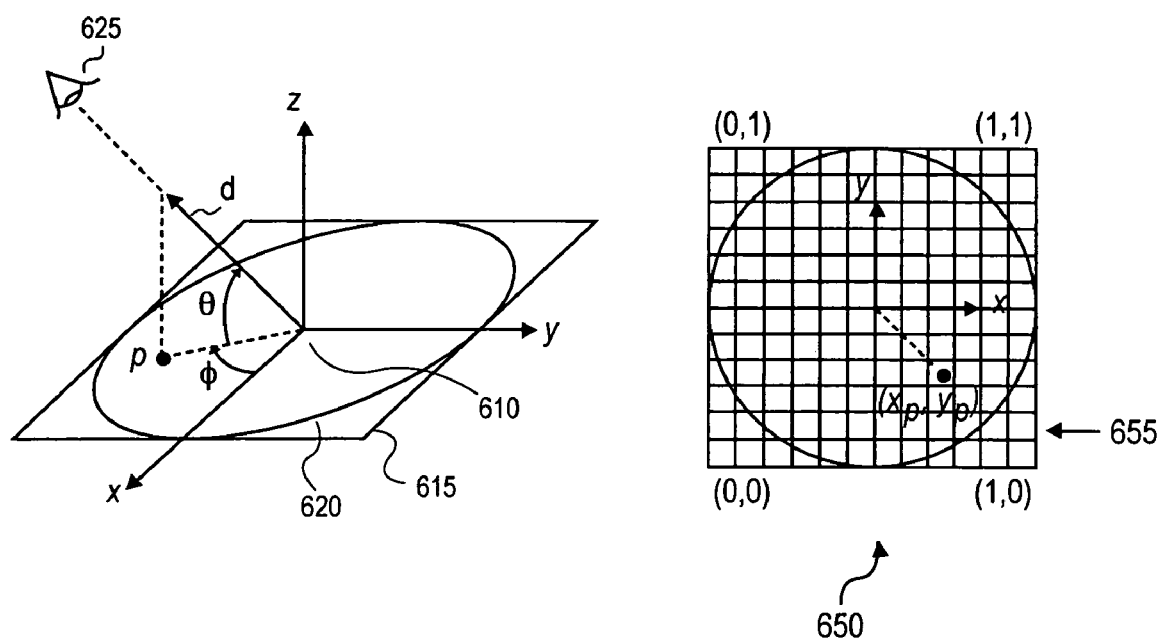
FIG. 6 shows converting viewing directions into texture coordinates, according to one embodiment of the present invention.

Maps may be created using the surface light field approximations. FIG. 6 shows conversion of a viewing direction into texture coordinates to determine the pixels of a view map texture $H_k$, by orthographically projecting the points of the hemisphere onto an xy-plane that has been shifted to fit into the traditional texture coordinates range. An xyz reference frame 610, similar to the reference frames previously discussed, is at the center of a square 615 circumscribing a circle 620 which both lie in the xy-plane of the coordinate system. The circle corresponds to perimeter in the xy-plane of an imaginary unit hemisphere sitting on the xy-plane and centered at the origin. The points on the hemisphere represent different viewing directions expressed in reference frame 610, where the viewing direction is represented by the unitary viewing direction d pointing from the origin toward an eye location 625. A point P corresponds to the orthographic projection of the unitary vector into the xy-plane. As previously discussed, the unitary vector can be expressed in terms of azimuth and elevation angles, $\theta$ and $\phi$. At 650 the coordinate system and unitary hemisphere are viewed looking directly into the z-axis. As shown, square 615 now corresponds to a regular two-dimensional square grid 655 with x-values ranging from (0,0) to (1,0), y-values ranging from (0,0) to (0,1), and with the origin of the coordinate system located at coordinates (0.5, 0.5). This corresponds to the xy-plane shifted to fit into the traditional texture coordinates range. In this grid point P corresponds to coordinates $(x_p, y_p)$ which may be assigned a numerical value. This approach allows a simple computation of the texture coordinates:

$$x=(d_x+1)/2 \quad y=(d_y+1)/2 \qquad (13)$$

In other words, the x coordinate is computed as where d represents the viewing direction and vectors x and y correspond to the axis of the local reference frame of the triangle. Other transformations from 3D directions to 2D maps are possible.

Figure 7:
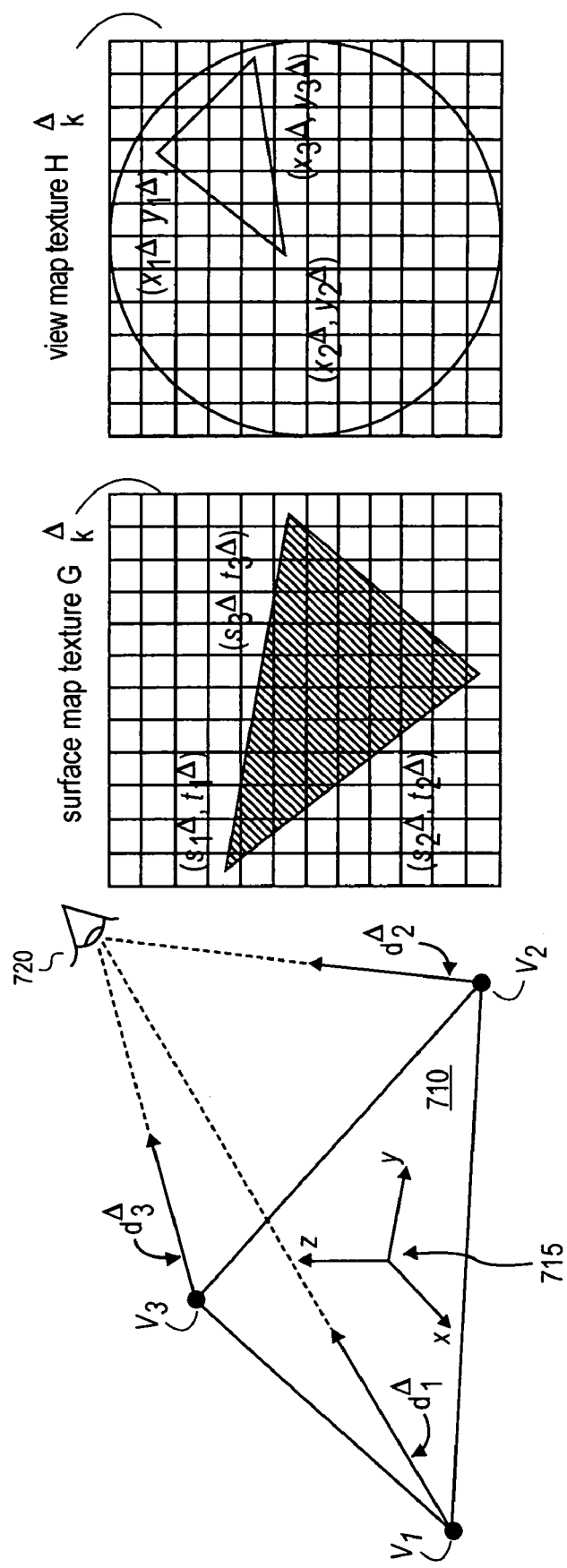
FIG. 7 shows a view texture map and surface texture map for triangle-centered decomposition, according to one embodiment of the present invention.

FIG. 7 shows creation of light field maps for triangle-centered rendering of an exemplary triangle 710. The exemplary triangle has a reference frame 715 that is consistent with the triangle-centered reference frames previously discussed. The triangle has vertices $v_1$, $v_2$, and $v_3$. Each of the three vertices is viewed from a fixed eye location 720. Unitary viewing direction vectors $d_1^\Delta$, $d_{21}^\Delta$, and $d_3^\Delta$ are used to represent the viewing direction to each of vertices $v_1$, $v_2$, and $v_3$, respectively. Surface map texture $G_k^\Delta$ has texture coordinates $(s_1^\Delta, t_1^\Delta)$, $(s_2^\Delta, t_2^\Delta)$, and $(s_3^\Delta, t_3^\Delta)$ corresponding to each of the three vertices $v_1$, $v_2$, and $v_3$. View map texture $H_k^\Delta$ has texture coordinates $(x_1^\Delta, y_1^\Delta)$, $(x_2^\Delta, y_2^\Delta)$, and $(x_3^\Delta, y_3^\Delta)$, which may be determined by projecting the unitary vectors onto the shifted xy-plane as discussed in FIG. 5.

Triangle-Centered Rendering

This section explains how the triangle-centered approximation introduced in Equation 6 can be used for light field mapping. Consider an exemplary triangle with light field texture maps $G_k^\Delta$ and $H_k^\Delta$, k=1, ..., K. Recall that the triangle-centered partitioning of the surface light field introduced a local coordinate system for each mesh triangle, as was shown in FIG. 2.

Rendering begins by calculating the view texture coordinates $(_i^\Delta, y_i^\Delta)$. This is done by applying Equation 13 to vectors $d_i^\Delta$ representing the viewing directions for triangle vertices $v_i$ expressed in the triangle reference frame. Note that the surface texture coordinates $(s_i^{\Delta,}{}^t{}_i^\Delta)$ are fixed and do not need to be recalculated when the viewing direction changes.

The rest of the rendering algorithm proceeds as follows. For the $k^{th}$ approximation term, first render the triangle using surface map texture $G_k^\Delta$ by assigning texture coordinates $(s_i^\Delta, t_i^\Delta)$ to vertices $v_i$ and store the result. Then render the same triangle using view map texture $H_k^\Delta$ by assigning texture coordinates $(x_i^\Delta, y_i^\Delta)$ to vertices vi. Perform pixel-by-pixel multiplication of the image obtained in the first rendering pass with the image obtained in the second rendering pass. Note that this corresponds to multiplying pixel-by-pixel the image projections of the shaded triangular texture fragment of the surface map texture and the shaded triangular texture fragment of the view map texture shown in FIG. 7. The same operations may be used to compute additional product terms in the summation. Summing all of the product terms generates the final approximation for the particular triangle. This may be repeated for all the visible triangles in the triangular mesh.

Vertex-Centered Rendering

This section explains how the vertex-centered approximation introduced in Equation (12) can be used for light field mapping. Rendering the vertex-centered approximation is very similar to rendering the triangle-centered approximation. One notable difference is that each triangle light field is approximated by a blend of three light field maps for each approximation term, rather than one pair. That is, approximating an exemplary triangle with light field texture maps uses $G_k^{vj}$ and $H_k^{vj}$, k=1, ..., K and j=1, 2, 3 to represent the K terms of the triangle. As was shown and discussed in FIG. 5, the textures are based on a vertex-centered partitioning coordinate system that uses unique coordinate systems for each vertex of the triangular mesh.

Figure 8:
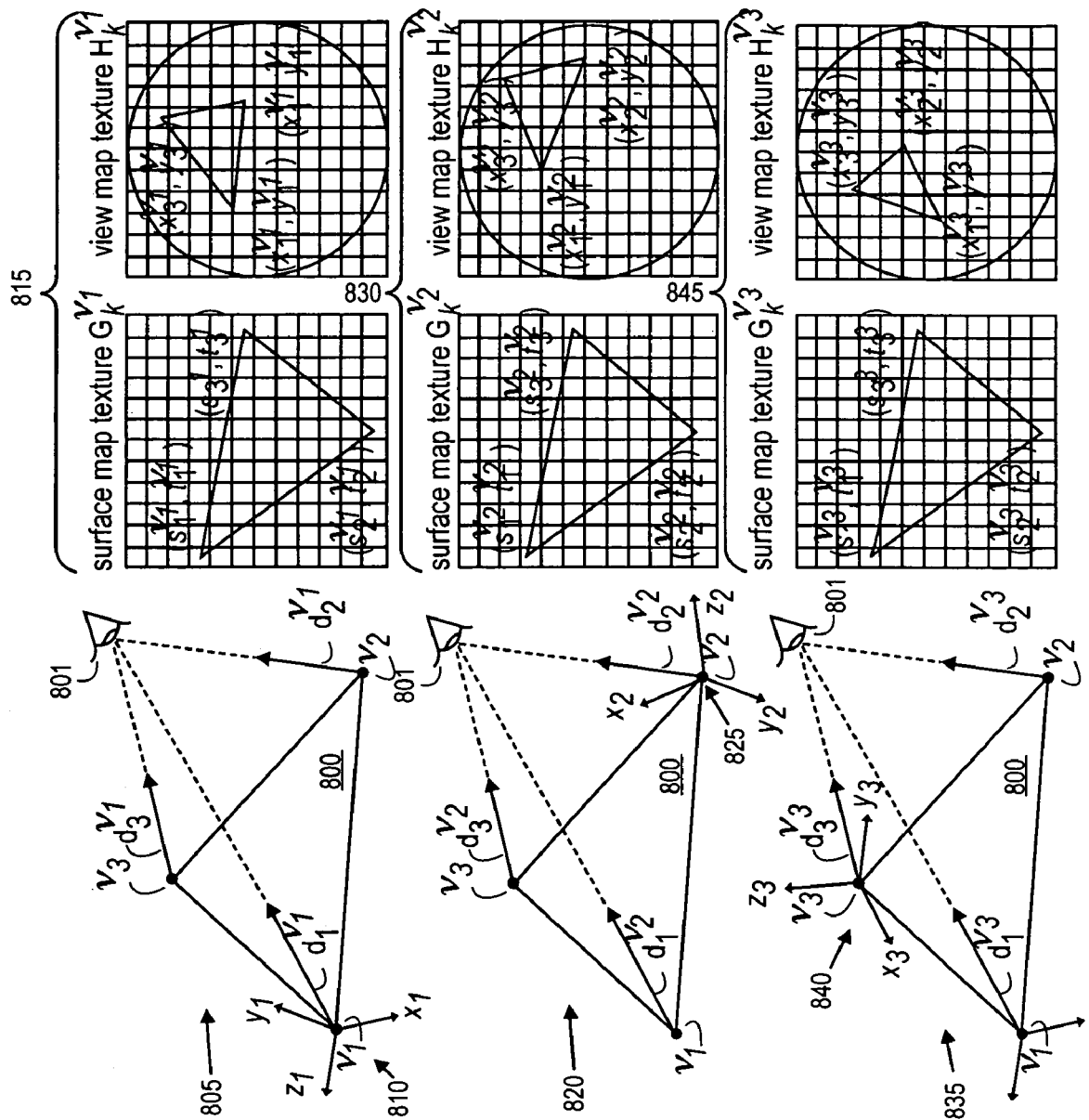
FIG. 8 shows view texture maps and surface texture maps for vertex-centered decomposition, according to one embodiment of the present invention.

FIG. 8 shows creation of the three pairs of surface and view map textures for a one-term approximation of the surface light field for an exemplary triangle 810. The triangle has vertices $v_1$, $v_2$, and $v_3$. A first depiction 805 shows the triangle with a reference frame 810 attached to the vertex $v_1$. The three unitary viewing direction vectors do $d_1^{v1}$, $d_2^{v1}$, and $d_3^{v1}$, which correspond to vertices $v_1$, $v_2$, and $v_3$, are expressed in the reference frame 810. A pair of surface and view map textures 815, corresponding to the triangle and the unitary vectors expressed in the reference frame 810, may be determined substantially as previously discussed. The surface map textures are weighted based on their barycentric coordinates with respect to vertex $v_1$, as indicated by the gradient shading. As indicated in Equation 11, this is the result of weighting that was applied during the construction of matrix $F^{vj}$. The weighting did not significantly alter the rendering algorithm. A second depiction 820 shows the triangle with a reference frame 825 attached to the vertex $v_2$. The three unitary viewing direction vectors $d_1^{v2}$, $d_2^{v2}$, and $d_3^{v2}$, which correspond to vertices $v_1$, $v_2$, and $V_3$, are expressed in the reference frame 825. A pair of surface and view map textures 830, corresponding to the triangle and the unitary vectors expressed in the reference frame 825. A third depiction shows the triangle with a reference frame 840 attached to the vertex $V_3$. The three unitary viewing direction vectors $d_1^{v3}$, $d_2^{v3}$, and $d_3^{v3}$, which correspond to vertices $v_1$, $v_2$, and $v_3$, are expressed in the reference frame 840. A pair of surface and view map textures 845, corresponding to the triangle and the unitary vectors expressed in the reference frame 835.

The rendering algorithm starts by calculating the view texture coordinates $(x_i^{vj}, y_i^{vj})$ where i represents vertex $v_i$ and the superscript vj denotes the term is expressed in the reference frame of vertex $v_j$. This is done by using Equations 13 to vectors $d_i^{vj}$ representing the viewing directions for triangle vertices $v_i$ expressed in the reference frame of vertex $v_j$. Note that the surface texture coordinates $(s_i^{vj}, t_i^{vj})$ are fixed and do not need to be recomputed. In fact, they are the same for each vertex reference frame.

For the kth approximation term and vertex coordinates $v_j$, first the triangle is rendered using surface map texture $G_k^{vj}$ by assigning texture coordinates $(s_i^{vj}, t_i^{vj})$ to vertices $v_i$ and the result is stored. Then the same triangle is rendered using view map texture $H_k^{vj}$ by assigning texture coordinates $(x_i^{vj}, y_i^{vj})$ to vertices vi. Pixel-by-pixel multiplication of the image obtained in the first rendering pass with the image obtained in the second rendering pass is performed and the result is stored. Note that the above process corresponds to multiplying pixel-by-pixel the image projections of the two shaded texture fragments shown in each row of FIG. 8. The results of each multiplication of the two textures are to be added together and the rendering routine is repeated for each mesh triangle.

Hardware Accelerated Rendering

The predetermined combinations of maps discussed above may be combined to generate an appearance for the object. Computing or rendering of the appearances may be performed using traditional rendering methods and hardware. The traditional pixel pipeline involves eight stages: (1) stipple test, (2) z-buffer, (3) fetch texels from single texture; filter to final texel color, (4) texture blend, (5) add specular, (6) apply fog, (7) alpha blend, and (8) write to frame buffer. Combining two textures using traditional rendering methods and hardware involves rendering by applying texture mapping to the surface map, writing to the accumulation buffer, applying texture mapping to the view map, combining it with the contents of the accumulation buffer by pixel-by-pixel multiplication of the result of the first rendering by the result of the second rendering, and transferring the contents of the accumulation buffer into the frame buffer.

Alternatively, computing or rendering the appearances may be performed using hardware accelerated rendering, such as by using a graphics accelerator. The graphics accelerator may have fast memory (e.g., DRAM, VRAM), a video bus, and one or more graphics processors for fast and efficient execution of graphics related calculations, such as matrix operations. The graphics accelerator may receive tasks from the main CPU and carry out those tasks.

The particular approximation through the decomposition into the light field maps using SVD, NMF, or ASMF yields well to hardware accelerated rendering with multitexturing hardware. Multitexturing allows objects to be displayed with more texturally enhanced graphics to be used in about the same amount of computer time. Multitexturing hardware allows multiple textures to be manipulated in the same rendering pass, which increases overall rendering performance. For example, a first texture, such as a brick wall, may be combined with a second texture, such as graphiti.

Multitexturing allows multiple textures to be manipulated simultaneously. Multitexturing uses multiple hardware units, known as texture operation units, cascaded together to apply multiple textures to a primitive in a single pass. A single texture is associated with each unit. The texture operation units have render states that control pixel flow through the texture operation unit. For example, it may have six render states, with three associated with RGB (color), and another associated with alpha. The texture operation units also have filtering, clamping, and other render states. In a process known as texture blending cascade, results from earlier stages are carried over to subsequent stages until the final result is rasterized on the polygon. For example, multitexturing renders the geometrical primitive by applying texture mapping of the surface map to the object using the frame buffer, and subsequently rendering the primitive by applying texture mapping of the view map by performing pixel-by-pixel multiplication with the contents of the frame buffer. This may avoid the accumulation buffer, which is frequently implemented in software, and can be a bottleneck.

Multitexturing hardware allows multiple textures to be manipulated in the same rendering pass, which makes the hardware very compatible with certain embodiments of the present invention. Accordingly, representing the surface light fields with light field maps is very convenient, since these light field maps may be treated as textures by multitexturing hardware. This provides very fast and efficient rendering. Recall that one of the fundamental operations of the proposed rendering algorithms was the pixel-by-pixel multiplication or modulation of the one or more surface texture fragments by the corresponding one or more view texture fragments. This operation corresponds to evaluating one term of the approximation sum. The complete sum is evaluated by blending the results of individual modulation operations. Multitexturing hardware support enables the modulation of the two texture fragments to be computed very efficiently, such as in one rendering pass for certain implementations. This means that rendering from the triangle-centered representation requires only K rendering passes, where K is the number of terms in the approximation sum, and the vertex-based rendering algorithm requires 3K rendering passes to evaluate K approximation terms. Without the multitexturing hardware the approximation can be implemented using the accumulation buffer, although much less efficiently. After generating the appearance, the object may be displayed by applying the appearance to the geometry of the object and displaying the object on a display device.

A number of existing consumer-level graphics hardware are available to perform multitexturing, including among others, Microsoft® DirectX® 7 available from Microsoft of Redmond, Wash.; and GeForce Ultra™ available from nVIDIA of Santa Clara, Calif. As will be explained below, this allows graphics associated with the invention to be rendered quickly. nVIDIA's GeForce Ultra™ provides multitexturing and register combiner extensions that are very useful for efficient implementation of light field mapping.

Light field maps may have negative values. Some hardware offers extended color range. When there are negative values, more rendering passes may be needed, unless the graphics hardware allows modification of the limits of the pixel range from the traditional [0,1] range to a [min, max] range, such as [−1.5, 5]. nVIDIA's cards support extended color range through the register combiner extension, but they also clamp the output to positive values. This means that the surface light field approximations can be rendered using register combiners, but at the expense of an increased number of rendering passes. Let M be the result containing negative values of modulation of two texture fragments A and B. Let $M_+$ be the result of modulating fragments A and B using the register combiner extension. Note that $M_+$ is equal to M where M is positive and it is zero otherwise. Let $M_-$ be the result of modulating −A and B the same way. Note that M− is equal to −M where the latter is positive and it is zero otherwise. Therefore, M can be calculated by subtracting the outputs of the two modulations using blending: $M=M_+-M_-$. Since each modulation operation can be performed in one rendering pass, the register combiners extension allows one summation term of the surface light field approximation that contains negative values to be evaluated using at most two rendering passes.

Some hardware offers a fixed color range. Surface light field approximations may be rendered even when graphics hardware does not support extended pixel range, although the number of rendering passes increases significantly. In this situation, the texture map fragments A and B are separated into strictly non-negative fragments A+, B+, A−, B− such that A=A+−A− and B=B+−B−. Then the multiplication of AB is calculated in four rendering passes of strictly positive terms: AB=A+B+−A−B+−A+B−+A−B−. Blending that supports subtraction can be used.

Mean extraction may be performed. It is often advantageous to compute for each triangle the mean triangle view and subtract this from the light field matrix before the matrix decomposition. This changes the rendering routine slightly. First the triangle is texture mapped using its mean view, and then the approximation terms of the modified light field matrix are blended as previously described. In a lot of cases the mean triangle view represents an approximation to the diffuse component of the surface material and as such is often interesting to visualize independently from the light field data. Additionally, rendering the mean view triangle and K term approximation of the light field matrix with the mean view extracted produces comparable results as rendering K+1 term approximation of the original light field matrix. This is true for both the triangle-centered and the vertex-centered approximations of the light field data. Recall that each term of the vertex-centered approximation consists of a blend of 3 vertex light fields and, in the best case, requires 3 rendering passes to compute. Using mean view texture can therefore reduce the number of rendering passes for the vertex-centered approximation.

If rendering performance is of utmost importance, positive decomposition may be used. The light field matrix approximations can be modified so that computation can be performed with a minimal number of rendering passes. Recall that modulation of two texture fragments A and B produces a strictly positive result that can be rendered in one rendering pass using multitexturing hardware support. This can be used to reduce the rendering time of the light field approximations. Consider the triangle light field matrix $F^{\Delta i}$ in Equation 7 and let vector $f_m^{\Delta i}$ store the minimum value in each row of this matrix. Note that the matrix $F_+^{\Delta i}$, obtained from subtracting vector $f_m^{\Delta i}$ from each column of matrix $F^{\Delta i}$ has no negative elements. Since the singular value decomposition process has a property that the singular vectors corresponding to the largest singular value of the positive matrix are also positive, the light field maps corresponding to the first term of the decomposition of matrix $F_+^{\Delta i}$ will be strictly positive. Therefore, if the matrix $F^{\Delta i}$ is approximated as a sum of vector $f_m^{\Delta i}$ and the first decomposition term of matrix $F_+^{\Delta i}$ this approximation can be displayed in just two rendering passes, one rendering pass to display each term of the sum. Note that the vertex light field matrix $F^{vj}$ in Equation 11 can be decomposed in the same way, and that the resulting approximation can be evaluated in four rendering passes. For each triangle, one rendering pass is used to display the minimum vector and three rendering passes are used to display the positive decomposition term of each of the triangle vertices.

Multitexturing hardware may also have capabilities to allow more than two textures to be combined simultaneously. For example, multitexturing hardware may allow four or more textures to be accessed in one rendering pass. This extra capacity can be used in different ways to increase rendering speed and efficiency. Typically, it will be used to add more summation terms to the approximation. However, it may also be used to combine approximation terms for other triangles. The rendering operations may need modification to do this.

Rendering Results

Surface light field approximations for four objects with varying complexity and surface attributes were rendered using nVIDIA's GeForce Ultra™ graphics card on a PC-class hardware. Considering the vertex-centered rendering technique, one term approximations used 7 rendering passes, 2 terms used 13 rendering passes, and 3 terms used 19 rendering passes. Rendering performance varied between 22.4–32.7 frames-per-second (FPS) for the one-term approximations, 13.5–20.4 FPS for the two-term approximations, and 10.1–14.1 FPS for the three-term approximations. In each case, the results were displayed in a 1K×1K window with objects occupying approximately ⅓ of the window dimensions. The rendering performance is not very sensitive to image size. When the image size doubled, the frame rate decreased by only about 20%.

Providing Graphical Content Over a Transmission Medium

Figure 9:
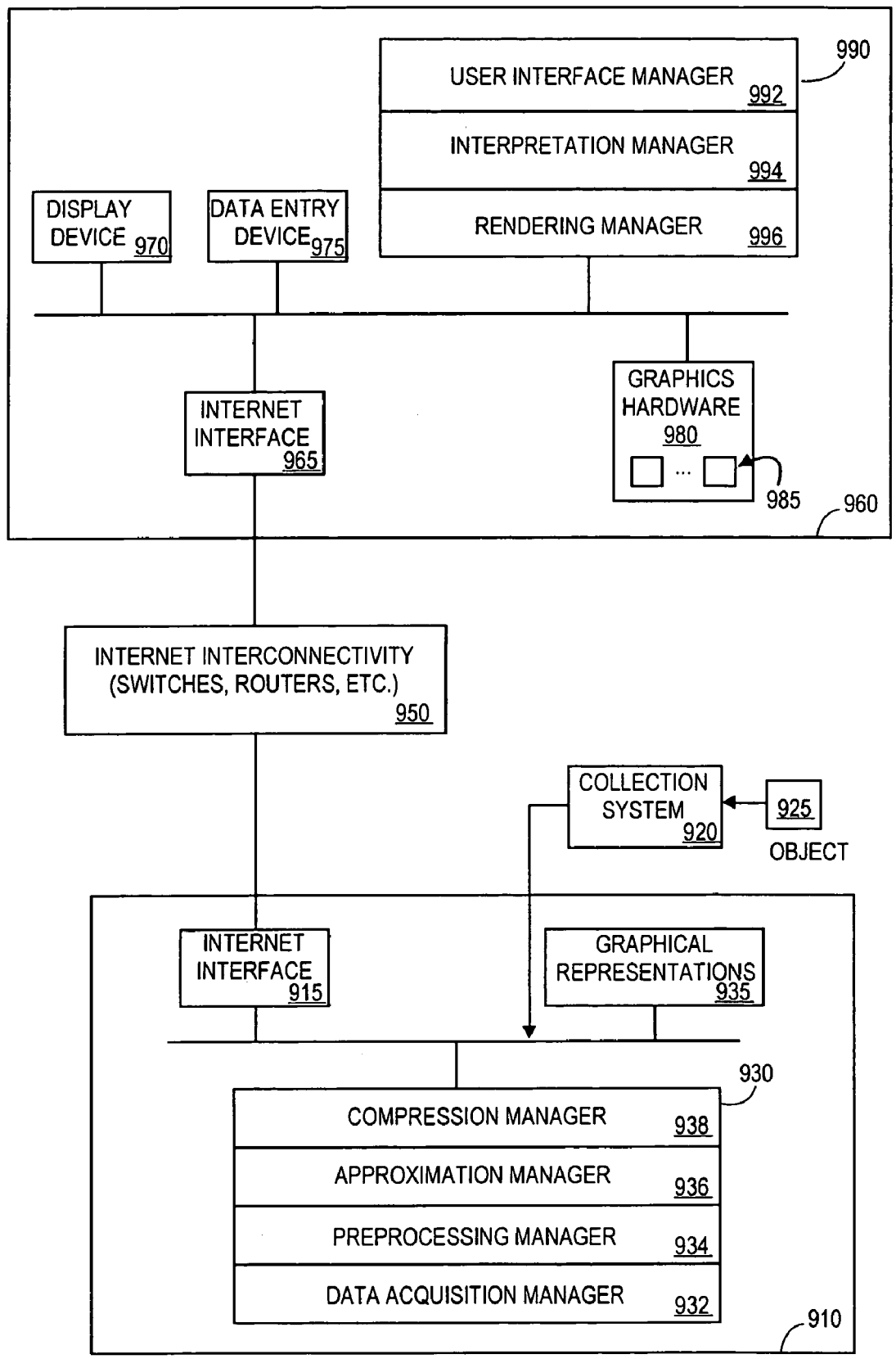
FIG. 9 shows an exemplary system for implementing the invention over the Internet, according to one embodiment of the present invention.

FIG. 9 shows an exemplary system 900 for delivering graphical content over a transmission medium, such as the Internet. Although an Internet transmission medium is described, other transmission mediums are possible, such as other computer networks (e.g., LANs, WANs, MANs), wireless communication devices such as pagers and phones, and other devices.

A first computer system 910 includes an Internet interface 915 to allow the first computer system to transmit graphical content via the Internet. The Internet comprises an Internet interconnectivity 950 that may include routers, switches, and the like to allow transmission of data. A second computer system 960 includes an Internet interface 965 to allow the second computer system to receive the graphical content via the Internet.

The first computer system typically includes a collection system 920 to input a graphical representation of an object 925. The collection system may include cameras, range scanners, and the like. Alternatively, the collection system and the object may not be used if the graphical representation is loaded from a computer-readable medium, or created using software. Typically, the first computer system will include components 930, typically software components, to acquire, process, and compress the graphical content that is to be transmitted. The components may include a data acquisition manager 932 to assist with acquiring graphical data for an object, such as from the collection system. A preprocessing manager 934 may be used to preprocess, resample, and standardize the graphical data prior to approximation. An approximation manager 936 may be used to create an approximate graphical representation based on the graphical data. A compression manager may be used to perform traditional compression on the approximate graphical representations. Naturally, there will be other components, such as components to enable the described components, and components to allow efficient interaction with the second computer system. For example, a component may be provided to determine how many approximation terms to transmit, by either requesting the information from the client, using a predetermined number for a certain speed of connection (e.g., more approximation terms for faster connections), monitoring congestion, and others. Typically, the approximate graphical representations will be prepared ahead of time and stored in a graphical representations library 935, which may be a memory or other computer-readable medium.

The first computer system transmits the approximate graphical representations and instructions that assist with interpreting and using the approximate graphical representations to the second computer system via the Internet interface. This will typically include transmitting a viewer, such as a plugin to the second computer system's web browser as an add-on application. This may be transmitted during this session, or during a previous or subsequent session. It may be registered with the browser, so that it can be invoked when the browser receives or detects an incoming file format or data structure associated with the viewer. Once activated, the viewer may perform as a stand-alone application. For example, the viewer may use instructions that allow the second computer system to access the file format or data structure of the compressed data, interpret it in a way that is consistent with the method used to compress it, and use the data to display a representation of the object, such as on a display device. The instructions may allow multiprocessing, parallel processing, hardware accelerated rendering, or multitexturing to be used to display the object. According to one embodiment, instructions are available for multiple types of graphical hardware, such as multitexturing hardware from different hardware vendors. The second computer system may be examined to determine the appropriate instructions to use. Alternatively, the second computer system may receive instructions specific to the particular hardware at the second computer system. The viewer may allow the first computer system to display the graphical content automatically with little additional interaction from the user of the first computer system.

The second computer system typically includes a display device 970 to display the graphical representation, a data entry device 975, such as a keyboard or a curser control device, to allow data entry or specification of user preferences. The second computer system may also have graphics hardware 980, which may be multitexturing hardware with multiple texture operation units 985. The second computer system will typically include components 990, such as software components that may be provided by the viewer, to provide a useage interface, manage usage of the transmitted graphical data, and perform rendering based on the transmitted graphical data. The components may include a user interface manager 992, such as a graphical user interface, to allow the user to easily interact with the approximate graphical representation and the first computer system. An interpretation manager 994 may interpret the approximate graphical representation and operate on the representation to put it in a format that may be rendered. For example, considering the singular value decomposition presented above, the approximation generator manager may determine an appropriate portion of the view maps to use in rendering, based on the viewing direction. The interpretation manager may also perform decompression according to vector quantization, or other standard compression techniques if the light field maps have been compressed by these standard techniques. The rendering manager 996 assists with displaying the graphical representation of the object, such as on the display device. For example, the rendering manager may use multitexturing hardware to combine surface and view texture maps for a particular viewing direction, or may provide software to mimic the operations of this hardware. These components may perform additional operations, such as any of the operations discussed above for the viewer, or other components may be used to add functionality.

Consider an exemplary use of the system in which a user of the second computer system uses a browser to access a web page associated with the first computer system. The web page has graphical content (or links to graphical content) associated with approximate graphical representations in accordance with the invention. The first computer system transmits approximate graphical representations, such as data structures in particular formats in accordance with various embodiments of the present invention, to the second computer system. For example, it may transmit a geometry representation, such as a triangular mesh, and a reflectance representation, such as surface and view maps. The second computer system may use a viewer downloaded previously from the Internet, to use the transmitted graphical data to display the graphical content. The user may then use the viewer, which may provide functional buttons, dials, data entry locations, etc, and the data entry device to change a viewing direction, viewing distance, select another object, such as by selecting the object from a list, or search a remote database for another object. Other uses will be apparent to those skilled in the art.

Exemplary Computer Architecture

As discussed herein, a "system", such as a system for approximating a graphical representation, may be an apparatus including hardware and/or software for processing data. The system may include, but is not limited to, a computer (e.g., portable, laptop, desktop, server, mainframe, etc.), hard copy equipment (e.g., film recorder, optical disk burner, printer, plotter, fax machine, etc.), and the like.

Figure 10:
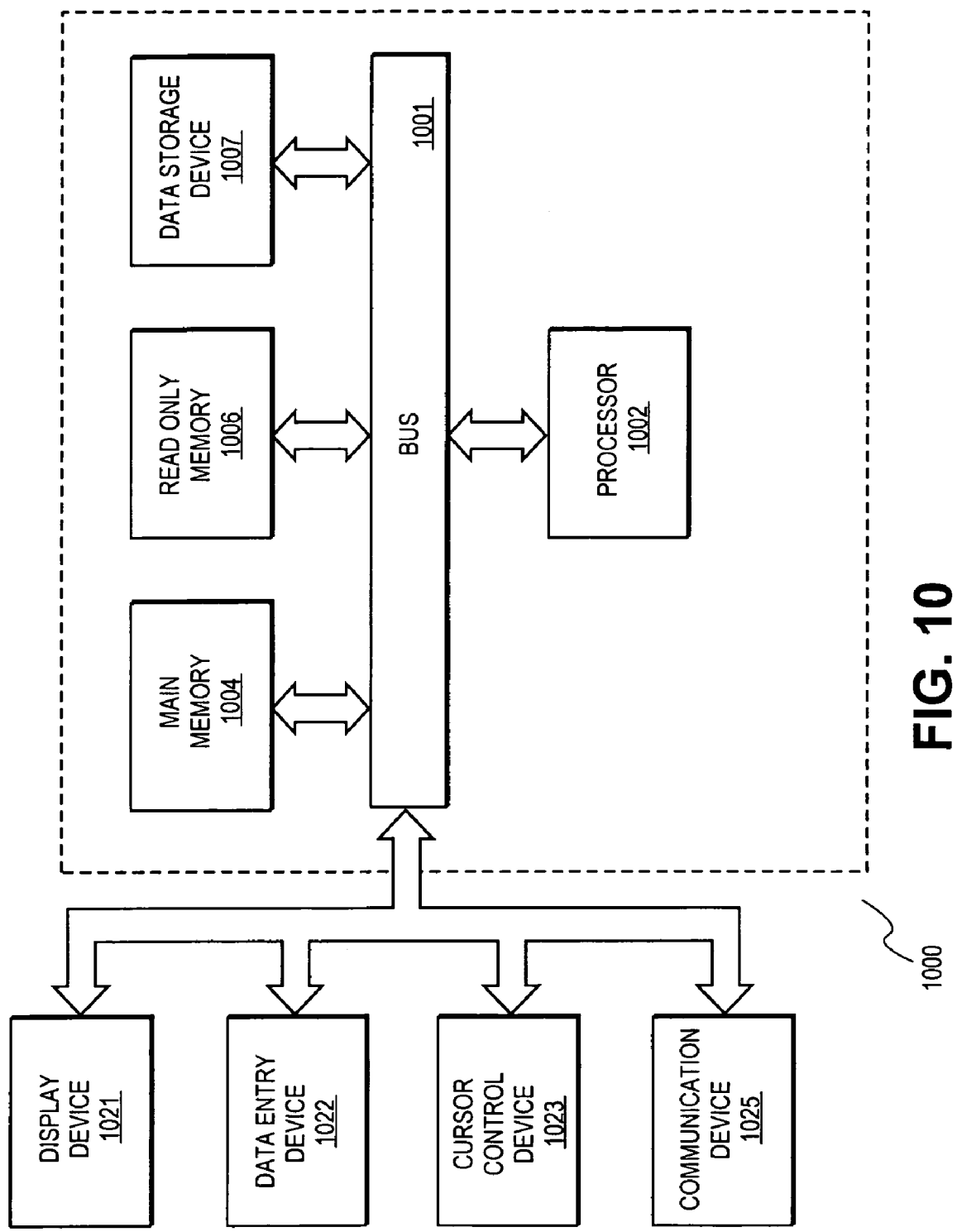
FIG. 10 is a block diagram of a computer system upon which one embodiment of the present invention may be implemented.

A computer system 1000 representing an exemplary workstation, host, or server in which features of the present invention may be implemented will now be described with reference to FIG. 10. The computer system 1000 represents one possible computer system for implementing embodiments of the present invention, however other computer systems and variations of the computer system 1000 are also possible. The computer system 1000 comprises a bus or other communication means 1001 for communicating information, and a processing means such as processor 1002 coupled with the bus 1001 for processing information. The computer system 1000 further comprises a random access memory (RAM) or other dynamic storage device 1004 (referred to as main memory), coupled to the bus 1001 for storing information and instructions to be executed by the processor 1002. The main memory 1004 also may be used for storing temporary variables or other intermediate information during execution of instructions by the processor 1002. In one embodiment, the main memory 1004 may be used for storing graphical representations, compression and approximation instructions, approximate graphical representations, and rendering instructions. The computer system 1000 also comprises a read only memory (ROM) and other static storage devices 1006 coupled to the bus 1001 for storing static information and instructions for the processor 1002. A data storage device 1007 such as a magnetic disk, zip, or optical disc and its corresponding drive may also be coupled to the computer system 1000 for storing information and instructions. In one embodiment, the data storage device 1007 may be used to access graphical representations and store approximate graphical representations to film, magnetic, optical, or other media.

The computer system 1000 may also be coupled via the bus 1001 to a display device 1021, such as a cathode ray tube (CRT) or Liquid Crystal Display (LCD), for displaying information to an end user. Typically, a data input device 1022, such as a keyboard or other alphanumeric input device including alphanumeric and other keys, may be coupled to the bus 1001 for communicating information and command selections to the processor 1002. Another type of user input device is a cursor control device 1023, such as a mouse, a trackball, or cursor direction keys for communicating direction information and command selections to the processor 1002 and for controlling cursor movement on the display 1021.

A communication device 1025 is also coupled to the bus 1001. Depending upon the particular implementation, the communication device 1025 may include a modem, a network interface card, or other well-known interface devices, such as those used for coupling to Ethernet, token ring, or other types of physical attachment for purposes of providing a communication link to support a local or wide area network, for example. In any event, in this manner, the computer system 1000 may be coupled to a number of clients or servers via a conventional network infrastructure, such as a company's intranet or the Internet, for example. The communication device may be used to send graphical representations to other computer systems.

The invention is not limited to any particular computer system. Rather, embodiments may be used on any stand alone, distributed, networked, or other type of computer system. For example, embodiments may be used on one or more computers compatible with NT, Linux, Windows, Macintosh, any variation of Unix, or others.

The present invention includes various steps, as described above. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product that may include a machine-readable medium having stored thereon instructions that may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Alternative Embodiments of the Present Invention

Those skilled in the art will recognize that many variations of the present invention are possible. The appearance representation to be approximated may be pre-filtered to reduce noise or redundancy before applying the method. This may be useful if the filtering has a higher selectivity for important information than the invention, but does not have other features of the invention.

The surface light field representation could also be converted to another color space. For example, the surface light field matrix could be mathematically converted to YUV color space, which is based on luminance and chromanance. This may allow more chrominance information to be discarded, especially at higher frequencies, since this information is typically is less important to human perception anyway.

Additional parameters may be added to the functions described. For example, the method may be applied to functions where additional parameters have been added to allow various features to change in time. For example, additional parameters may allow the location of the light source to be varied, the intensity of the light to be varied, and other flexibilities. Modified methods will be apparent to those of skill in the art, based on the disclosure herein.

Also, many uses of the present invention will be apparent to those skilled in the art. For example, the invention may be used to providing visual representations of objects in conjunction with selling those objects, such as on the Internet or otherwise, may be used to improve video games, may be incorporated in computer generated images such as to add special effects to feature films. For example, a graphical representation may be used to add a spaceship to a film scene, where the spaceship is viewed from different viewing directions under constant lighting conditions, such as those provided by a nearby star. The invention may also be used to add content to 3D TV or HDTV. Or the graphical representations may be included in machine-readable format, such as on a CD-ROM, in the form of a famous sculpture distributed as part of an electronic encyclopedia, and other uses. Other uses will be apparent.

In conclusion, the present invention provides a system and method for compressing graphical data for a three-dimensional object. Compressing includes approximating a graphical representation that describes the appearance of the object from multiple viewing directions by removing redundant information from the graphical representation. The system and method may allow the graphical data to be displayed using hardware-assisted computation.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising;
    accessing a first multi-dimensional graphical matrix representation that describes the appearance of a plurality of points of an object from a plurality of viewing directions, the appearance varying from point to point and viewing direction to viewing direction;
    creating a second graphical representation that approximates the first graphical representation and that includes at least one expression having a fewer dimensions than the first multi-dimensional graphical representation by decomposing the first multi-dimensional graphical representation into the second graphical representation, the decomposing including sign consistent matrix factorization to selectively represent information from the first graphical representation.

2. The method of claim 1, wherein the sign consistent matrix factorization comprises non-negative matrix factorization.

3. The method of claim 1, wherein the sign consistent matrix factorization comprises alternating sign matrix factorization.

4. The method of claim 1, further comprising:
    accessing a third multi-dimensional graphical representation that describes the appearance of a second plurality of points of the object from a plurality of viewing directions, the second plurality of points including the first plurality of points, and the appearance varying from point to point and viewing direction to viewing direction; and
    partitioning the third multi-dimensional graphical representation into a plurality of smaller multi-dimensional graphical representations each associated with a primitive of a polygonal representation of the geometry of the object, the plurality of smaller multi-dimensional graphical representations including the first multi-dimensional graphical representation.

5. A machine-readable medium having stored thereon data representing sequences of instructions that when executed cause a machine to perform operations comprising:
    access of a first multi-dimensional graphical matrix representation that describes the appearance of a plurality of points of an object from a plurality of viewing directions, the appearance varying from point to point and viewing direction to viewing direction;
    creation of a second graphical representation that approximates the first graphical representation and that includes at least one expression having a fewer dimensions than the first multi-dimensional graphical representation by decomposing the first multi-dimensional graphical representation into the second graphical representation, the decomposing including sign consistent matrix factorization to selectively represent information from the first graphical representation.

6. A machine-readable medium of claim 5 having stored thereon data representing sequences of instructions that when executed cause a machine to perform operations comprising a non-negative matrix factorization when performing the sign consistent matrix factorization.

7. A machine-readable medium of claim 5 having stored thereon data representing sequences of instructions that when executed cause a machine to perform operations comprising an alternating sign matrix factorization when performing the sign consistent matrix factorization.

8. A machine-readable medium of claim 5 having stored thereon data representing sequences of instructions that when executed cause a machine to perform operations comprising
- access of a third multi-dimensional graphical representation that describes the appearance of a second plurality of points of the object from a plurality of viewing directions, the second plurality of points including the first plurality of points, and the appearance varying from point to point and viewing direction to viewing direction; and
- partition of the third multi-dimensional graphical representation into a plurality of smaller multi-dimensional graphical representations each associated with a primitive of a polygonal representation of the geometry of the object, the plurality of smaller multi-dimensional graphical representations including the first multi-dimensional graphical representation.

9. A system comprising
- a hardware module that accesses a first multi-dimensional graphical matrix representation that describes the appearance of a plurality of points of an object from a plurality of viewing directions, the appearance varying from point to point and viewing direction to viewing direction;
- a matrix multiplication module in the hardware module that computes a second graphical representation that approximates the first graphical representation and that includes at least one expression having a fewer dimensions than the first multi-dimensional graphical representation by decomposing the first multi-dimensional graphical representation into the second graphical representation, the decomposing including sign consistent matrix factorization to selectively represent information from the first graphical representation.

10. The system of claim 9, wherein the sign consistent matrix factorization comprises non-negative matrix factorization.

11. The system of claim 9, wherein the sign consistent matrix factorization comprises alternating sign matrix factorization.

12. The system of claim 1, further comprising:
- a submodule of the hardware module that accesses a third multi-dimensional graphical representation that describes the appearance of a second plurality of points of the object from a plurality of viewing directions, the second plurality of points including the first plurality of points, and the appearance varying from point to point and viewing direction to viewing direction; and further partitions the third multi-dimensional graphical representation into a plurality of smaller multi-dimensional graphical representations each associated with a primitive of a polygonal representation of the geometry of the object, the plurality of smaller multi-dimensional graphical representations including the first multi-dimensional graphical representation.

* * * * *